US010577830B2

(12) United States Patent
Grice et al.

(10) Patent No.: US 10,577,830 B2
(45) Date of Patent: *Mar. 3, 2020

(54) IDENTIFICATION MODULE FOR KEY MAKING MACHINE

(71) Applicant: The Hillman Group, Inc., Cincinnati, OH (US)

(72) Inventors: Byron Keith Grice, Phoenix, AZ (US); Phillip Gerlings, Chandler, AZ (US); John Clayton Campbell, Phoenix, AZ (US); Michael James Schmidt, Gilbert, AZ (US)

(73) Assignee: The Hillman Group, Inc., Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/557,145

(22) Filed: Aug. 30, 2019

(65) Prior Publication Data

US 2020/0002975 A1    Jan. 2, 2020

Related U.S. Application Data

(63) Continuation of application No. 16/421,013, filed on May 23, 2019, now Pat. No. 10,400,474, which is a
(Continued)

(51) Int. Cl.
*E05B 19/14* (2006.01)
*G07F 17/00* (2006.01)
(Continued)

(52) U.S. Cl.
CPC ............... *E05B 19/14* (2013.01); *B23C 3/35* (2013.01); *B23P 15/005* (2013.01);
(Continued)

(58) Field of Classification Search
None
See application file for complete search history.

(56) References Cited

U.S. PATENT DOCUMENTS

| 488,058 A | 12/1892 | Breed |
| 1,135,676 A | 4/1915 | Engelbert |
| (Continued) | | |

FOREIGN PATENT DOCUMENTS

| CA | 2365738 A1 | 9/2000 |
| DE | 102005027102 A1 | 12/2006 |
| (Continued) | | |

OTHER PUBLICATIONS

International Search Report dated Mar. 19, 2015 listing PCT/US2014/049740 filed Aug. 5, 2014.
(Continued)

*Primary Examiner* — Reza Aghevli
(74) *Attorney, Agent, or Firm* — Finnegan, Henderson, Farabow, Garrett & Dunner LLP

(57) ABSTRACT

An identification module is disclosed for use in a key making machine. The identification module may have a key receiving assembly configured to receive only a shank of an existing key. The identification module may also have a tip guide, configured to receive a tip of the shank of the existing key. The tip guide may have a slot that exposes a tip end of the shank. The identification module may also have an imaging assembly configured to capture an image of the tip end through the slot.

30 Claims, 13 Drawing Sheets

Related U.S. Application Data continuation of application No. 15/711,748, filed on Sep. 21, 2017, now Pat. No. 10,301,844, which is a continuation of application No. 14/263,595, filed on Apr. 28, 2014, now Pat. No. 9,797,163.

(60) Provisional application No. 61/904,810, filed on Nov. 15, 2013, provisional application No. 61/866,603, filed on Aug. 16, 2013.

(51) Int. Cl.
| | | |
|---|---|---|
| *E05B 19/04* | (2006.01) | |
| *H04N 5/235* | (2006.01) | |
| *B23P 15/00* | (2006.01) | |
| *G06K 7/14* | (2006.01) | |
| *E05B 19/00* | (2006.01) | |
| *G06K 9/20* | (2006.01) | |
| *G06K 9/00* | (2006.01) | |
| *G06Q 20/14* | (2012.01) | |
| *B23C 3/35* | (2006.01) | |

(52) U.S. Cl.
CPC .......... *E05B 19/0058* (2013.01); *E05B 19/04* (2013.01); *G06K 7/1413* (2013.01); *G06K 9/00* (2013.01); *G06K 9/2036* (2013.01); *G06Q 20/14* (2013.01); *G07F 17/0014* (2013.01); *H04N 5/2354* (2013.01); *B23C 2235/12* (2013.01); *B23C 2235/28* (2013.01); *B23C 2235/41* (2013.01); *G06K 2209/19* (2013.01); *Y10T 70/7842* (2015.04); *Y10T 409/300952* (2015.01)

(56) References Cited

U.S. PATENT DOCUMENTS

| | | | |
|---|---|---|---|
| 1,165,099 A | 12/1915 | Hoernel | |
| 1,243,810 A | 10/1917 | Christoph | |
| 1,400,678 A | 12/1921 | Holbrook | |
| 1,422,155 A | 7/1922 | Wetherholt | |
| 1,462,150 A | 7/1923 | Segal | |
| 1,587,181 A | 6/1926 | Pomeroy et al. | |
| 1,614,852 A | 1/1927 | Scharf | |
| 1,656,295 A | 1/1928 | Schechter | |
| 1,697,747 A | 1/1929 | Bachmann | |
| 1,752,668 A | 4/1930 | Johnson | |
| 1,800,209 A | 4/1931 | Christopherson | |
| 1,811,922 A | 6/1931 | Falk | |
| 1,869,631 A | 8/1932 | Swanson | |
| 2,095,196 A | 10/1937 | Paquette | |
| 2,148,667 A | 2/1939 | Yoskowitz et al. | |
| 2,582,012 A | 1/1952 | Currier | |
| 2,682,809 A | 7/1954 | May | |
| 2,712,769 A | 7/1955 | Prescott | |
| 2,821,064 A | 1/1958 | Nelson | |
| 3,116,665 A | 1/1964 | Reisner | |
| 3,265,245 A * | 8/1966 | Harden ................ | G07F 7/00 221/124 |
| 3,323,420 A | 6/1967 | Roxburgh | |
| 3,358,561 A | 12/1967 | Roxburgh et al. | |
| 3,413,892 A | 12/1968 | Casey et al. | |
| 3,442,174 A | 5/1969 | Weiner et al. | |
| 3,496,636 A | 2/1970 | Lieptz | |
| 3,602,092 A | 8/1971 | Richens | |
| 3,682,041 A | 8/1972 | Essig | |
| 3,748,940 A | 7/1973 | Muri | |
| 3,780,550 A | 12/1973 | Simorghi | |
| 3,796,130 A | 3/1974 | Gartner | |
| 3,797,291 A | 3/1974 | Simorghi | |
| 3,865,011 A | 2/1975 | Patriquin | |
| 3,978,764 A | 9/1976 | Patriquin | |
| 4,055,880 A | 11/1977 | Moessner | |
| 4,159,783 A | 7/1979 | Crasnianski | |
| 4,235,087 A | 11/1980 | Bianchi | |
| 4,294,096 A * | 10/1981 | Heimann ................ | B23C 3/35 101/269 |
| 4,666,351 A | 5/1987 | Marchal | |
| 4,741,652 A | 5/1988 | Marchal | |
| 4,752,876 A | 6/1988 | Couch et al. | |
| 4,899,391 A * | 2/1990 | Cimino ................ | G06K 9/00 340/680 |
| 4,901,548 A | 2/1990 | Deslandes | |
| 5,167,171 A | 12/1992 | Heredia | |
| 5,172,829 A | 12/1992 | Dellicker, Jr. | |
| 5,271,698 A * | 12/1993 | Heredia ................ | B23C 3/35 409/82 |
| 5,314,274 A * | 5/1994 | Heredia ................ | B23C 3/35 409/81 |
| 5,351,409 A | 10/1994 | Heredia | |
| 5,383,345 A | 1/1995 | Kallinger-Prskawetz-Jacobsen | |
| 5,443,339 A | 8/1995 | Heredia et al. | |
| 5,496,138 A | 3/1996 | Drori | |
| 5,538,374 A | 7/1996 | Cole et al. | |
| 5,538,534 A | 7/1996 | Cole et al. | |
| 5,546,316 A | 8/1996 | Buckley et al. | |
| 5,556,240 A * | 9/1996 | Almblad ................ | B23C 3/35 409/81 |
| 5,569,003 A | 10/1996 | Goldman et al. | |
| 5,607,267 A | 3/1997 | Heredia et al. | |
| 5,660,509 A | 8/1997 | Cole et al. | |
| 5,671,523 A | 9/1997 | Juchinewicz | |
| 5,676,504 A | 10/1997 | Mueller et al. | |
| 5,739,766 A | 4/1998 | Chaloux | |
| 5,764,156 A | 6/1998 | Chaloux | |
| 5,771,176 A * | 6/1998 | Froehlich ............ | E05B 49/002 235/382 |
| 5,807,042 A * | 9/1998 | Almblad ................ | B23C 3/35 250/202 |
| 5,833,406 A | 11/1998 | Chies et al. | |
| 5,844,808 A | 12/1998 | Konsmo et al. | |
| 5,906,365 A | 5/1999 | Wu | |
| 5,908,273 A | 6/1999 | Titus et al. | |
| 5,951,218 A | 9/1999 | Wu | |
| 5,956,985 A | 9/1999 | Chang | |
| 5,964,554 A | 10/1999 | Drori | |
| 5,974,844 A | 11/1999 | Harrelson et al. | |
| 5,997,224 A | 12/1999 | Beauregard et al. | |
| 6,064,747 A * | 5/2000 | Wills ................ | B23C 3/35 382/100 |
| 6,065,911 A * | 5/2000 | Almblad ................ | B23C 3/35 250/202 |
| 6,106,131 A | 8/2000 | Hao | |
| 6,152,662 A * | 11/2000 | Titus ................ | B23C 3/35 409/132 |
| 6,185,311 B1 | 2/2001 | Yanovsky et al. | |
| 6,237,756 B1 | 5/2001 | Caudle | |
| 6,371,286 B1 | 4/2002 | Montanari | |
| 6,406,227 B1 | 6/2002 | Titus et al. | |
| 6,449,381 B1 | 9/2002 | Yanovsky et al. | |
| 6,543,972 B1 | 4/2003 | Cimino | |
| D475,195 S | 6/2003 | Christianson | |
| 6,588,995 B2 * | 7/2003 | Wills ................ | B23C 3/35 269/106 |
| 6,595,045 B1 | 7/2003 | Fuglewicz et al. | |
| 6,602,030 B1 | 8/2003 | Markbreit | |
| 6,641,339 B2 | 11/2003 | Chies et al. | |
| 6,647,308 B1 * | 11/2003 | Prejean ................ | B23C 3/35 700/117 |
| 6,651,470 B1 | 11/2003 | Rafter | |
| 6,684,673 B2 | 2/2004 | Florendo | |
| 6,782,725 B2 | 8/2004 | Linares | |
| 6,801,829 B2 | 10/2004 | Kawai | |
| 6,839,449 B1 | 1/2005 | Campbell et al. | |
| 6,892,558 B2 | 5/2005 | Chodosh | |
| 6,895,100 B1 | 5/2005 | Pacenzia et al. | |
| 7,055,352 B2 | 6/2006 | Meyerson et al. | |
| 7,077,607 B2 | 7/2006 | Foscan | |
| 7,167,892 B2 | 1/2007 | Defossé et al. | |
| 7,214,011 B2 | 5/2007 | Ryai, Sr. et al. | |
| 7,280,034 B2 | 10/2007 | Matsumoto et al. | |
| 7,380,428 B2 | 6/2008 | Morehart et al. | |

(56) References Cited

U.S. PATENT DOCUMENTS

| | | |
|---|---|---|
| 7,387,476 B2 | 6/2008 | Ryai, Sr. |
| 7,527,458 B2 | 5/2009 | Ryai, Sr. et al. |
| D618,983 S | 7/2010 | Downes |
| 7,890,878 B2 | 2/2011 | Bass et al. |
| 7,891,919 B2 | 2/2011 | Bass et al. |
| 7,918,629 B2 | 4/2011 | Belflower et al. |
| 8,074,481 B2 | 12/2011 | Bass et al. |
| 8,126,764 B2 | 2/2012 | Murray et al. |
| 8,128,322 B2 | 3/2012 | Bass et al. |
| 8,142,117 B2 | 3/2012 | Belflower et al. |
| 8,191,779 B2 | 6/2012 | Illingworth et al. |
| 8,214,247 B2 | 7/2012 | Murray et al. |
| 8,215,625 B2 | 7/2012 | Wu |
| 8,225,696 B2 | 7/2012 | Downes |
| 8,287,215 B2 | 10/2012 | Freeman et al. |
| 8,292,556 B2 | 10/2012 | Ryai, Sr. et al. |
| D674,590 S | 1/2013 | Busch |
| 8,342,783 B2 | 1/2013 | Ryai, Sr. |
| 8,373,558 B2 | 2/2013 | Sagady et al. |
| 8,408,851 B2 * | 4/2013 | Hadad .................. B23C 3/35 409/82 |
| 8,484,068 B2 | 7/2013 | Godwin et al. |
| 8,484,070 B2 | 7/2013 | Murray et al. |
| 8,532,809 B2 | 9/2013 | Freeman |
| 8,600,546 B1 | 12/2013 | Hagen et al. |
| 8,626,331 B2 | 1/2014 | Marsh et al. |
| 8,634,951 B2 | 1/2014 | Freeman |
| 8,676,273 B1 * | 3/2014 | Fujisaki .............. H04M 1/6505 455/567 |
| 8,682,468 B2 | 3/2014 | Marsh et al. |
| 8,979,446 B2 | 3/2015 | Freeman |
| 8,992,145 B1 | 3/2015 | Mueller et al. |
| 9,073,133 B1 | 7/2015 | Mueller et al. |
| 9,149,877 B1 | 10/2015 | Mueller et al. |
| 9,199,318 B2 | 12/2015 | Freeman et al. |
| 9,243,426 B2 * | 1/2016 | Gerlings ............ E05B 19/0017 |
| 9,323,237 B2 | 4/2016 | Freeman |
| 9,468,982 B1 | 10/2016 | Mueller et al. |
| 9,487,968 B2 * | 11/2016 | Gerlings ................ E05B 19/04 |
| 9,506,272 B2 * | 11/2016 | Gerlings ................ E05B 19/04 |
| 9,556,649 B1 | 1/2017 | Mueller et al. |
| 9,558,236 B1 * | 1/2017 | Hagen .................. B23C 3/35 |
| 9,563,885 B2 | 2/2017 | Marsh et al. |
| 9,580,932 B2 | 2/2017 | Gerlings et al. |
| 9,586,272 B1 | 3/2017 | Mueller et al. |
| 9,764,393 B2 | 9/2017 | Mueller et al. |
| 9,797,163 B2 * | 10/2017 | Grice .................. E05B 19/04 |
| 9,808,900 B2 | 11/2017 | Gardner et al. |
| 9,895,753 B2 | 2/2018 | Huss et al. |
| 9,914,179 B2 | 3/2018 | Freeman et al. |
| 9,987,715 B2 | 6/2018 | Gardner et al. |
| 10,013,833 B2 | 7/2018 | Blalock et al. |
| 10,040,135 B2 | 8/2018 | Gardner et al. |
| 10,124,420 B2 | 11/2018 | Spangler et al. |
| 10,196,834 B2 | 2/2019 | Gerlings |
| 10,252,392 B2 | 4/2019 | Gardner et al. |
| 10,259,052 B2 | 4/2019 | Gardner et al. |
| 10,301,844 B2 * | 5/2019 | Grice .................. E05B 19/04 |
| 10,400,474 B1 * | 9/2019 | Grice .................. H04N 5/2354 |
| 2001/0033781 A1 * | 10/2001 | Wills .................. B23C 3/35 409/81 |
| 2002/0022901 A1 | 2/2002 | Wetterlin et al. |
| 2002/0031251 A1 | 3/2002 | Campbell et al. |
| 2002/0141843 A1 * | 10/2002 | Mueller ............... B23C 3/35 409/132 |
| 2004/0148988 A1 | 8/2004 | Taylor |
| 2004/0253067 A1 | 12/2004 | Bosch |
| 2005/0241353 A1 | 11/2005 | Moening |
| 2006/0044109 A1 * | 3/2006 | Griffits .............. E05B 17/103 340/5.65 |
| 2006/0048553 A1 | 3/2006 | Almquist |
| 2006/0090528 A1 | 5/2006 | Moening |
| 2007/0224008 A1 * | 9/2007 | Bass .................. G06Q 20/18 409/132 |
| 2008/0145163 A1 | 6/2008 | Freeman et al. |
| 2009/0074528 A1 * | 3/2009 | Hadad .................. B23C 3/35 409/82 |
| 2009/0180664 A1 * | 7/2009 | Efstathiades ............ G06K 9/00 382/100 |
| 2009/0228795 A1 | 9/2009 | Bass et al. |
| 2010/0048302 A1 * | 2/2010 | Lutnick ............... G07F 17/3286 463/42 |
| 2010/0052234 A1 | 3/2010 | Ryai, Sr. |
| 2010/0278437 A1 | 11/2010 | Thompson et al. |
| 2010/0278438 A1 | 11/2010 | Thompson et al. |
| 2010/0316250 A1 | 12/2010 | Perrigo |
| 2011/0110741 A1 | 5/2011 | Huss et al. |
| 2011/0167377 A1 | 7/2011 | Bass et al. |
| 2011/0176881 A1 | 7/2011 | Bass et al. |
| 2011/0262240 A1 | 10/2011 | Mutch et al. |
| 2011/0297691 A1 | 12/2011 | Freeman |
| 2011/0301738 A1 | 12/2011 | Freeman |
| 2012/0014762 A1 | 1/2012 | Ryai, Sr. et al. |
| 2012/0038453 A1 | 2/2012 | Bass et al. |
| 2012/0154127 A1 | 6/2012 | Donadini |
| 2012/0213603 A1 | 8/2012 | Bass et al. |
| 2012/0243957 A1 | 9/2012 | Drake et al. |
| 2013/0017030 A1 | 1/2013 | Freeman et al. |
| 2013/0039530 A1 | 2/2013 | Manigault |
| 2013/0039714 A1 | 2/2013 | Ryai, Sr. et al. |
| 2013/0094918 A1 | 4/2013 | Ryai, Sr. |
| 2013/0170693 A1 * | 7/2013 | Marsh .................. G05B 15/02 382/100 |
| 2013/0294857 A1 * | 11/2013 | Bass .................. B23C 3/35 409/82 |
| 2013/0331976 A1 * | 12/2013 | Freeman ............... B23Q 35/00 700/117 |
| 2014/0113683 A1 * | 4/2014 | Hickey .................. G06K 9/00 455/556.1 |
| 2014/0148941 A1 | 5/2014 | Marsh et al. |
| 2014/0314508 A1 | 10/2014 | Seriff et al. |
| 2014/0377027 A1 | 12/2014 | Burkett et al. |
| 2015/0050094 A1 * | 2/2015 | Gerlings ............... E05B 19/04 409/81 |
| 2015/0286201 A1 | 10/2015 | Marsh et al. |
| 2016/0004892 A1 | 1/2016 | Marsh et al. |
| 2016/0114412 A1 * | 4/2016 | Bosch .................. G01B 21/20 409/81 |
| 2016/0321632 A1 | 11/2016 | Moore et al. |
| 2016/0346847 A1 * | 12/2016 | Gerlings ................ E05B 19/04 |
| 2017/0008096 A1 | 1/2017 | Mueller et al. |
| 2017/0008097 A1 | 1/2017 | Marsh et al. |
| 2017/0100785 A1 | 4/2017 | Hagen et al. |
| 2017/0103516 A1 | 4/2017 | Mueller et al. |
| 2017/0136557 A1 | 5/2017 | Huss et al. |
| 2017/0225242 A1 | 8/2017 | Spangler et al. |
| 2018/0010364 A1 | 1/2018 | Grice et al. |
| 2018/0071838 A1 | 3/2018 | Gerlings et al. |
| 2018/0079014 A1 | 3/2018 | Marsh et al. |
| 2018/0079015 A1 | 3/2018 | Marsh et al. |
| 2018/0154459 A1 | 6/2018 | Freeman |
| 2018/0236570 A1 | 8/2018 | Freeman et al. |
| 2018/0264561 A1 | 9/2018 | Schmidt et al. |
| 2019/0076938 A1 * | 3/2019 | Spangler .................. B23C 3/35 |
| 2019/0153749 A1 | 5/2019 | Gerlings |

FOREIGN PATENT DOCUMENTS

| | | |
|---|---|---|
| DE | 202012100455 U1 | 3/2012 |
| EP | 0362007 A2 | 4/1990 |
| EP | 0709154 | 5/1996 |
| EP | 1338732 | 8/2003 |
| EP | 2000303 | 12/2008 |
| EP | 2517826 | 10/2012 |
| GB | 191403275 A | 6/1914 |
| GB | 2276106 A | 9/1994 |
| GB | 2 340 644 A | 2/2000 |
| WO | WO 89/012867 | 12/1989 |
| WO | WO 93/006959 | 4/1993 |
| WO | WO 02/001480 | 1/2002 |
| WO | WO 02/101180 A2 | 12/2002 |

(56) References Cited

FOREIGN PATENT DOCUMENTS

| WO | WO 2007/093982 | | 8/2007 | |
|---|---|---|---|---|
| WO | WO 2015/023484 | | 2/2015 | |
| WO | WO-2015023484 | A1 * | 2/2015 | ............ B23P 15/005 |

OTHER PUBLICATIONS

International Preliminary Report on Patentability dated Feb. 16, 2016 listing PCT/US2014/049740 filed Aug. 5, 2014.
International Search Report dated Mar. 19, 2015 listing PCT/US2014/049901 filed Aug. 6, 2014.
International Preliminary Report on Patentability dated Feb. 16, 2016 listing PCT/US2014/049901 filed Aug. 6, 2014.
International Search Report dated Mar. 19, 2015 listing PCT/US2014/050047 filed Aug. 7, 2014.
International Preliminary Report on Patentability dated Feb. 16, 2016 listing PCT/US2014/050047 filed Aug. 7, 2014.
"Green Curtain Projects Confidential", Dec. 2009.
Office Action dated Dec. 13, 2018 in U.S. Appl. No. 15/699,610, 13 pages.
Office Action dated May 17, 2019 in U.S. Appl. No. 15/919,693, 10 pages.
"BD Laser Computerized High Security Key Machine"; *Locksmith Ledger*; Jul. 1, 2005 (3 pp.).
BD Laser Max Use and Maintenance Manual (24 pp.).
Blue Shark Manual Pt. 1-8 (2002) (70 pp.).
Hy-Ko C3 Certified ChipKey Center Quick Start Program; Mar. 20, 2009 (7 pp.).
Hy-Ko Certified ChipKey Center website; Jan. 2, 2012 (2 pp.).
Hy-Ko Key Product Guide (24 pp.).
B. Donahue, "Key-Cutting Cos. Lock Down Antitrust, Patent Settlements," Law 360, Nov. 1, 2019 (2 pp.).
Home Improvements, Jun. 26, 2009 (2 pp.).
Key Product Guide (24 pp.).
"I-400: Multlock's Industrial Machine for Multi-Row Dimple Keys"; Jan. 30, 2013; https://www.youtube.com/watch?v=d93Q_IC56qc.
"Key Machines, Blue Shark Stand-Alone Hand Activated Robotic Keymachine"; *HPC World*; Dec. 2, 2002 (2 pp.).
"Keyline Dezmo & Dromo"; Apr. 20, 2010; https://www.youtube.com/watch?v=DkVJfDA3afo.
Keyline Ultegra 884 Decryptor Operating Manual; Dec. 2010 (46 pp.).
Keyline Ultegra 884 Decryptor Operating Manual; Dec. 2011 (62 pp.).
Contentions cover paper; Nov. 15, 2019 (42 pp.).
Claim Charts Ex C-1 through Ex C-24; Nov. 15, 2019 (1092 pp.).
"KID 1—Mach Intro"; May 14, 2019; https://www.youtube.com/watch?v=eFlzMeCPdEs.
"Make Keys Quick With Minute Key in Lowes—Big Brother Is Watching . . . "; Jun. 29, 2013; https://www.youtube.com/watch?v=kAYTKwPG6a0.
Medeco Products Catalog; May 7, 2006 (177 pp.).
"Minute Key"; Apr. 14, 2013; https://www.youtube.com/watch?v=Q_obxkvd9xM.
"Minutekey Key Duplicator"; Jun. 18, 2011, https://www.youtube.com/watch?v=nYo9zm303_l.
Minute Key website; http://www.minutekey.com.
Mul-T-Lock Classic Systems Webpage, May 3, 2008 (1 p.).
Mul-T-Lock Machinery Webpage, May 3, 2008 (1 p.).
Pro Tech Technical Features, Sep. 2012 (7 pp.).
Silca Company History Webpage (2 pp.).
Silca ID46 P-BOX video; Mar. 9, 2012; https://www.youtube.com/watch?v=wYtC7Uu0i7M.
Silca New Products website; Dec. 23, 2010 (2 pp.).
Silca Pro Tech, https://www.youtube.com/watch?v=C8PQXt_Pscw.
Silca Pro Tech product brochure (2 pp.).
Silca Pro Tech Series: Overview (5 pp.).
Silca Pro Tech Series: Pro Tech Configurations (3 pp.).
Silca RW4 Operating Manual v1 (2006) (40 pp.).
Silca RW4 Plus Operating Manual v6 (2010) (63 pp.).
Silca Transponder Technology Brochure; Feb. 28, 2007 (4 pp.).
Silca Unocode 299-399 Optional Accessories Guide (2012) (16 pp.).
Silca Unocode 399 Manual v7 (2002) (85 pp.).
Silca Unocode 399 Plus Manual v1 (2010) (98 pp.).
"Unocode 399 Plus"; *Silca Magazine* (2 pp.).
Unocode 399 Plus webpage (1 p.).
Wilco Supply, Key Machines, Blue Shark (27 pp.).

* cited by examiner

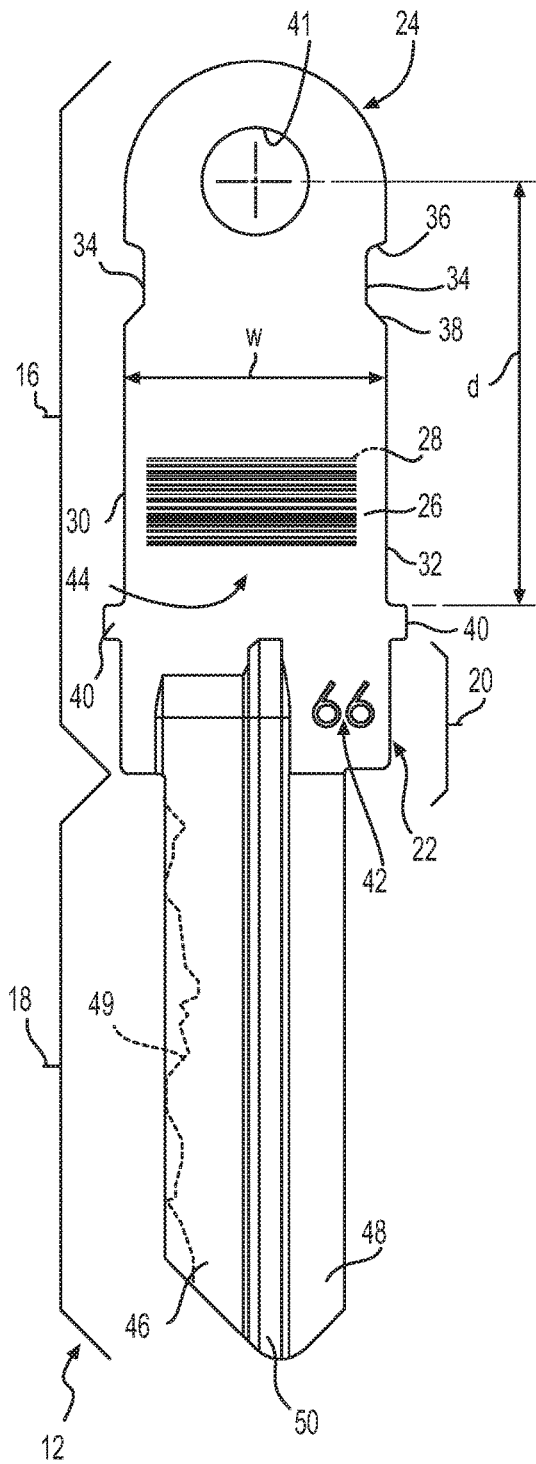
FIG. 2A
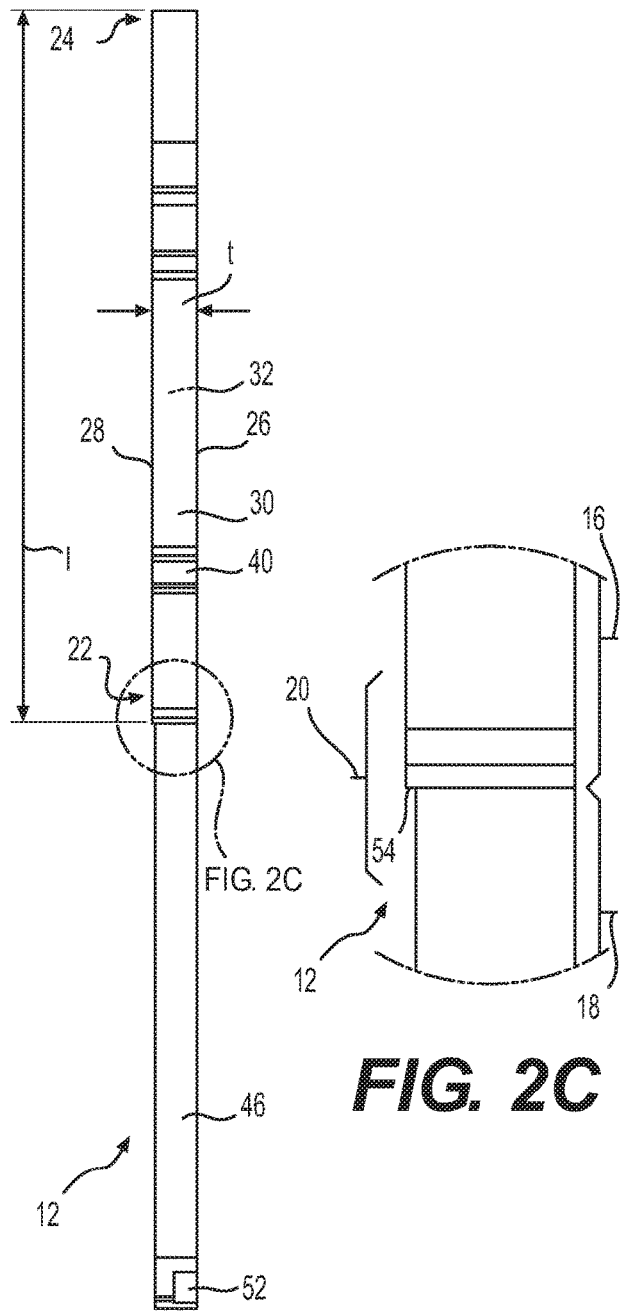
FIG. 2B
FIG. 2C

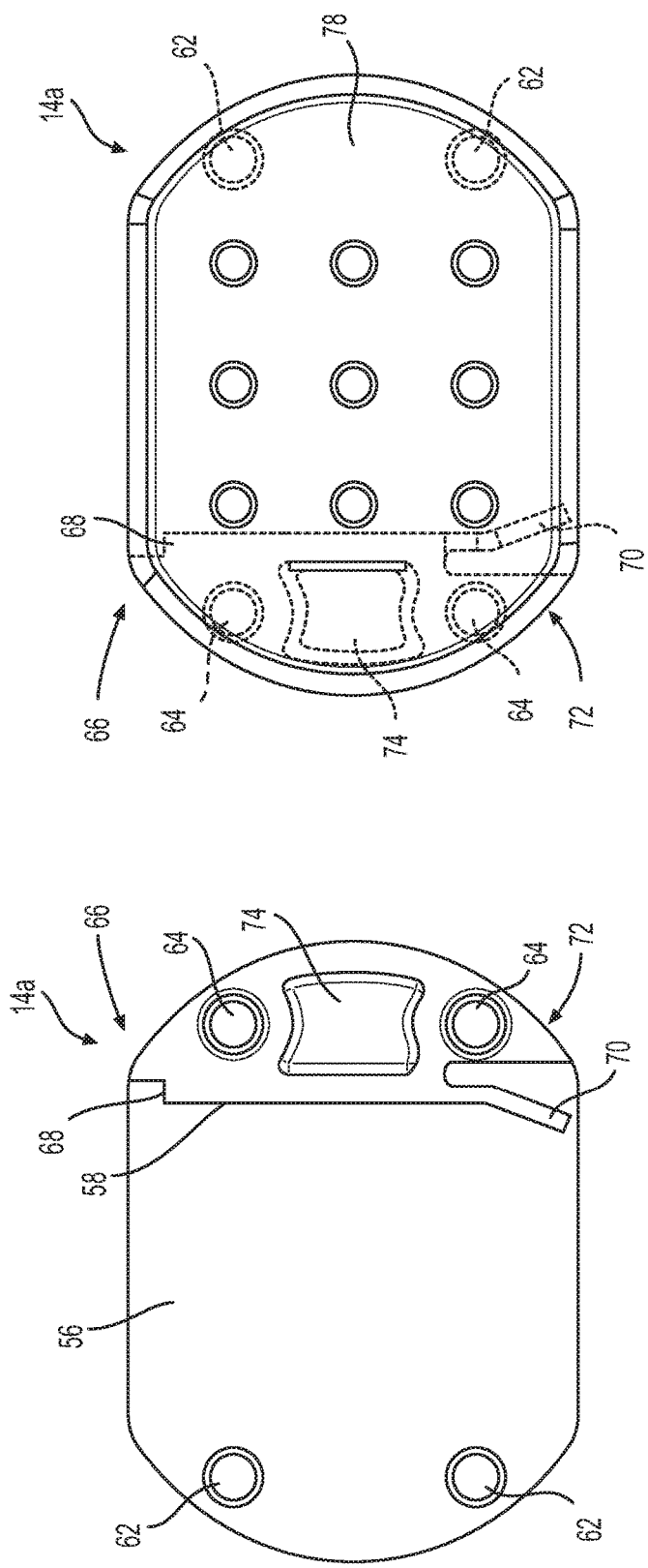
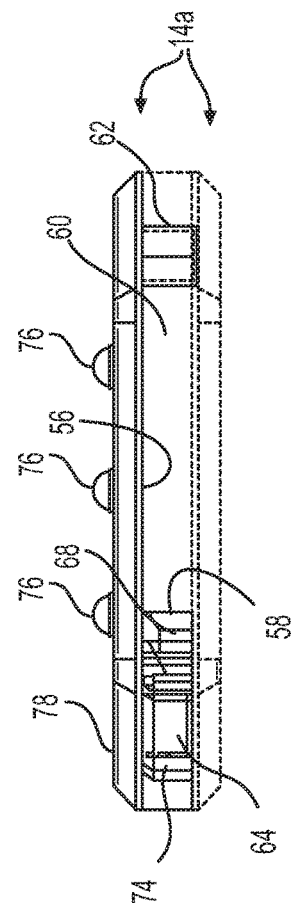

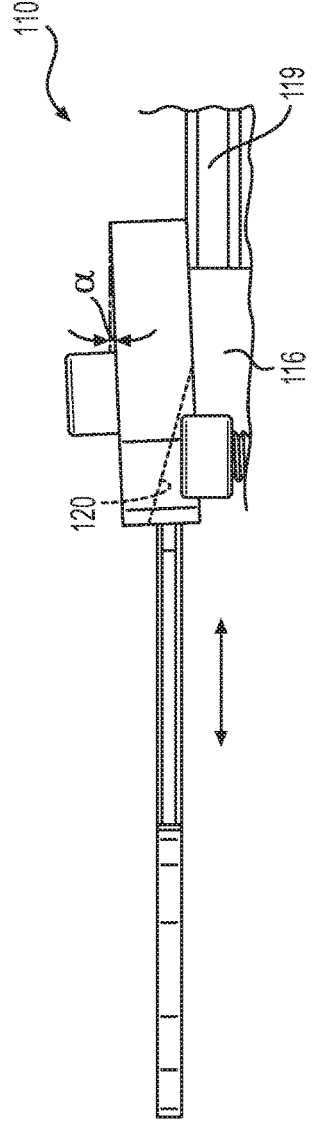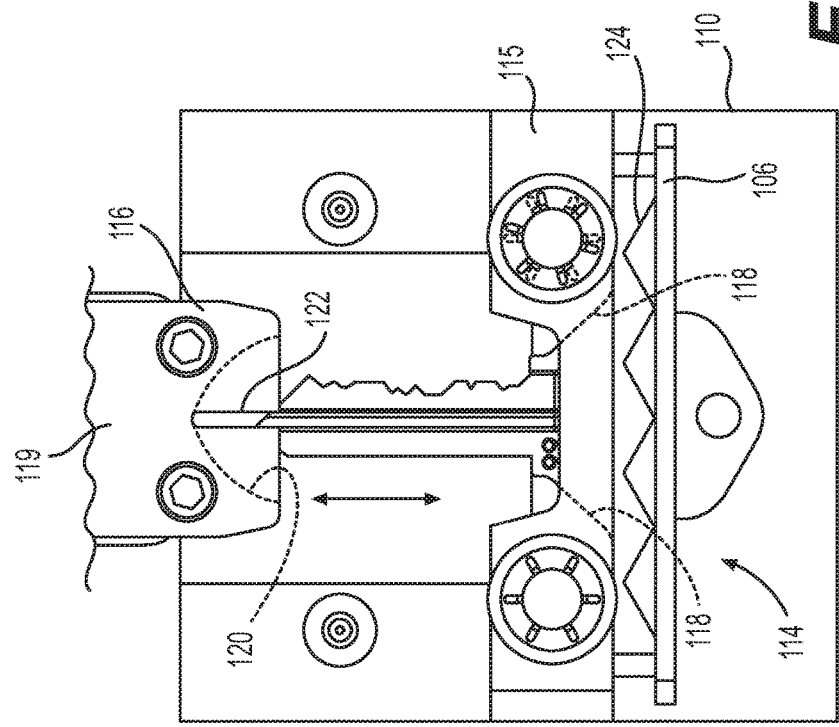

IDENTIFICATION MODULE FOR KEY MAKING MACHINE

RELATED APPLICATIONS

This application is a continuation application under 35 U.S.C. § 120 of U.S. patent application Ser. No. 16/421,013, filed May 23, 2019, pending, which is a continuation of U.S. patent application Ser. No. 15/711,748, filed Sep. 21, 2017, now U.S. Pat. No. 10,301,844, which is a continuation of U.S. patent application Ser. No. 14/263,595, filed Apr. 28, 2014, now U.S. Pat. No. 9,797,163, which claims the benefit of priority under 35 U.S.C. § 119 from U.S. Provisional Application No. 61/866,603 entitled MODULAR KEY DUPLICATION SYSTEM USING COMMON KEY BLANKS that was filed on Aug. 16, 2013, and from U.S. Provisional Application No. 61/904,810 entitled KEY ASSEMBLY AND DUPLICATION MACHINE that was filed on Nov. 15, 2013, the contents of all of which are expressly incorporated herein by reference.

TECHNICAL FIELD

The present disclosure is directed to an identification module and, more particularly, to an identification module for a key making machine.

BACKGROUND

Key making machines are used to create new keys or copies of existing keys. In conventional machines, a key blank is selected that corresponds with the intended use of the new key or with the existing key. The key blank is then mounted in a clamp, and cutting wheels are moved to cut a pattern of notches within the key blank that correspond with a desired pattern of notches. The key blank selection process, the clamping process, and/or the cutting process may be implemented manually or automatically. Manual processes, however, tend to introduce errors that result in miscuts of the key blank.

An exemplary automated key duplication machine is disclosed in U.S. Patent Application Publication 2012/0243957 of Drake et al. that published on Sep. 27, 2012 ("the '957 publication"). In particular, the '957 publication discloses a key duplication machine having a key blank identification system and a key fabrication system incorporated into a single apparatus. The key blank identification system uses an optical imaging device to capture a silhouette of an inserted master key when backlighting is turned on. The silhouette is measured to determine a depth, angle, and position of each tooth in the master key, and to determine if the master key includes a pattern on one side or on both sides. A comparison of these features with features stored in memory leads to determining and selecting of a key blank used to duplicate the master key. The selected key blank is then completely inserted into the machine without regard to orientation, and the key blank is validated to ensure that the proper key blank was retrieved by the user. Validation is performed by taking an image of the key blank with the optical imaging device, and comparing features of the key blank (size and shape of shoulders, length, width, single side or dual side, number of steps, etc.) to known features of the proper key blank. The image of the key blank is also used to determine alignment of the key blank. The key blank is then repositioned by opposing fingers based on the image, and another image is taken to confirm alignment. Once the key blank is properly aligned, the key blank is moved onto a fixed bottom member, and a top member is pressed down along a length of the key blank to clamp the key blank in place. Two cutting wheels located at opposing edges of the key blank are then independently moved and operated to cut notches in the key blank corresponding to the notches in the master key. After cutting of the notches, another image of the key blank is taken to compare the newly cut key with the master key.

Although the duplication machine of the '957 publication may improve the key making process, it may still be less than optimal. In particular, the duplication machine of the '957 publication requires numerous images to be captured throughout the identification and cutting processes, and numerous comparisons to be made. The excessive number of images and comparisons can increase a time of the process, increase computing requirements, and introduce opportunities for error. In addition, the independent nature of the cutting wheels and use of alignment fingers further increases complexity of the machine and the likelihood for miscuts. And the configuration of the cutting wheels could result in shortened life of the duplication machine. Further, the duplication machine of the '957 publication requires the entire key blank to be inserted into the machine and the entire length of the key blank to be clamped, which can be difficult to achieve properly given the variety of different key blank heads. The motion of the cutting wheels may also be limited due to the clamping configuration of the '957 publication.

The disclosed identification module is directed to overcoming one or more of the problems set forth above and/or other problems of the prior art.

SUMMARY

In one aspect, the present disclosure is directed to an identification module for a key making machine. The identification module may include a key receiving assembly configured to receive only a shank of an existing key. The identification module further may further include a tip guide configured to receive a tip of the shank of the existing key, the tip guide having a slot that exposes a tip end of the shank. The identification module may also include an imaging assembly configured to capture an image of the tip end through the slot.

In another aspect, the present disclosure is directed to a method of imaging an existing key. The method may include receiving from a user only a shank of the existing key into a key receiving assembly, and guiding a tip end of the shank to a desired location with a tip guide. The method may further include capturing a backlight image of a tip end of the shank with a camera through a slot in the tip guide that exposes the tip end of the shank.

Additional objects and advantages of the invention will be set forth in part in the description which follows, and in part will be apparent from the description, or may be learned by practice of the embodiments. The objects and advantages of the invention will be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIGS. 2A-2C are front and side view illustrations of an exemplary disclosed key blade that forms a portion of the key assembly of FIG. 1A;

FIGS. 3A-3C are front, back, and side view illustrations of an exemplary disclosed head that receives the key blade of FIGS. 2A-2C to form the key assembly of FIG. 1A;

FIGS. 6A and 6B are side and top view illustrations of an exemplary disclosed key receiving assembly that may form a portion of the identification module of FIG. 5;

DETAILED DESCRIPTION

Figure 1C:
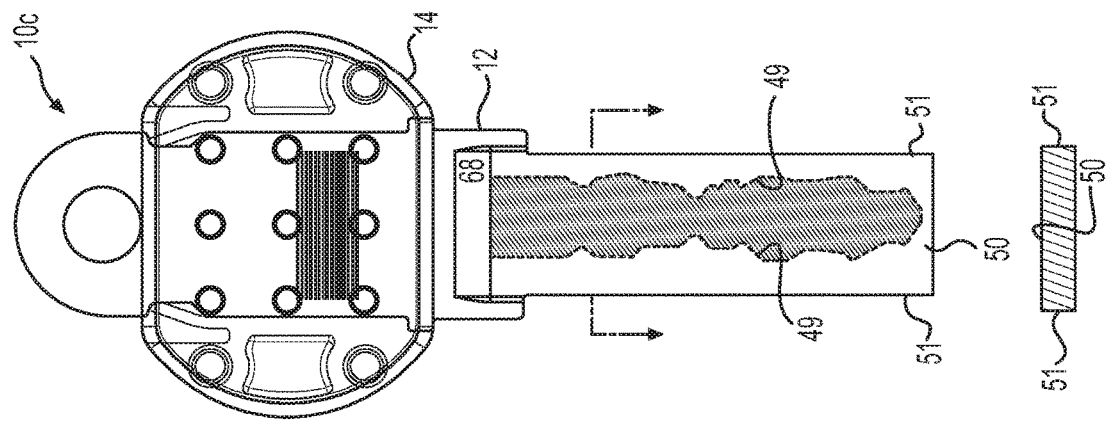
FIGS. 1A-1C are front view illustrations of three different exemplary disclosed key assemblies.
Figure 1B:
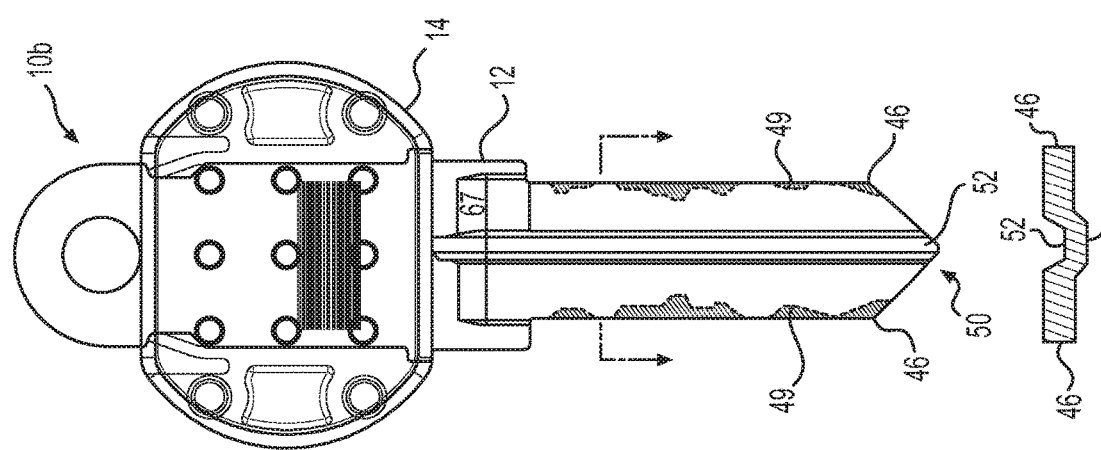
Figure 1A:
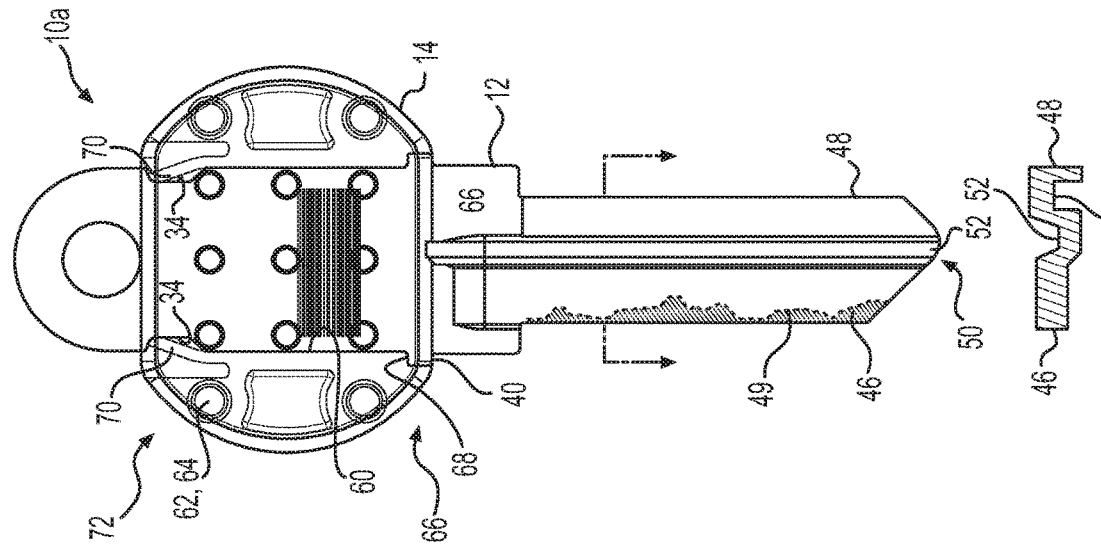

FIGS. 1A-1C illustrate three different exemplary key assemblies 10a, 10b, and 10c, which will collectively be referred to as key assembly 10 in this disclosure. Each key assembly 10 may be used as a means for gaining access to a variety of different secure applications, for example to automotive applications (e.g., door and ignition locks), to residential applications (e.g., dead bolt and handle locks), and to commercial applications (e.g., equipment and facility locks). Each key assembly 10 may generally include a blade 12, and a head 14 that is connected to blade 12. As shown in FIGS. 1A-1C, head 14 is a separate component or subassembly of components that is connected to blade 12 after formation of desired features within blade 12. It is contemplated that head 14 may be fixedly or removably connected to blade 12, as desired. When head 14 is connected to blade 12, one end or both ends (both ends shown in FIGS. 1A-1C) of blade 12 may protrude a distance from head 14. Head 14 may serve as a handle through which a user generates torque within blade 12, causing an associated lock to turn and open or close.

As shown in FIGS. 1A-1C, each of key assemblies 10a-10c may be a different type of key assembly. In particular, key assembly 10a may have a single edge-cut form (shown in FIG. 1A); key assembly 10b may have a dual edge-cut form (shown in FIG. 1B); and key assembly 10c may have a milled form (shown in FIG. 1C). In general, key assembly 10a, having the single edge-cut form, may include blade 12 with a single relatively thinner lengthwise outer edge 46 that is configured to be notched in a particular pattern (shown in phantom lines as notches 49) corresponding to the lock intended to receive blade 12, and a single relatively thicker opposing outer edge 48 that does not include notches 49. Key assembly 10b with the dual edge-cut form may have two opposing outer edges 46 that are notched and thinner relative to a thicker center section 50. Center sections 50 within blades 12 of both the single and dual edge-cut key assemblies 10a, 10b may include one or more channels 52 formed therein, such that an endwise cross-section of each assembly has a general zigzag shape. Key assembly 10c, having the milled form, may include relatively thicker square outer edges 51, with a planar center section 50 of about the same thickness (i.e., a cross-section of the milled form may be generally rectangular). Center section 50 of the milled key assembly 10c generally has an internal pattern of notches 49 that is milled within center section 50 and located away from edges 51, the pattern being variable and corresponding to the lock intended to receive blade 12.

An exemplary blade 12 for single edge-cut key assembly 10a is shown in FIGS. 2A-2C. As shown in these figures, blade 12 may include a head portion 16, and a shank 18 that is integrally formed with head portion 16. Head portion 16 may join shank 18 at a transition region 20. In the disclosed embodiment, blade 12 is formed from aluminum, brass, bronze, or another metal alloy through a stamping process and may or may not be painted or otherwise plated with a colored film. It is contemplated, however, that another material and/or process may be utilized to form blade 12, if desired.

Head portion 16 of blade 12 may have geometry designed to interact with corresponding geometry of head 14 (referring to FIGS. 1A-1C). In particular, as shown in FIGS. 2A-2C, head portion 16 may be generally plate-like, having a substantially uniform thickness t along its length l from a square shaped base end 22 within transition region 20 to a rounded tip end 24. In the disclosed embodiment, thickness t between opposing primary surfaces 26, 28 may be about 0.075-0.1 inches (e.g., about 0.08 inches) and length l may be about 1.25-1.5 inches (e.g., about 1.33 inches). Head portion 16 may also have a generally uniform width w between opposing side surfaces 30, 32 of about 0.4-0.5 inches (e.g., about 0.486 inches). These specific dimensions may be selected to produce a slip fit of head portion 16 within an internal cavity of head 14. Head portion 16 may be engaged on its two primary faces 26, 28 and its two substantially perpendicular side surfaces 30, 32 when slidingly received within head 14.

Each head portion 16 may also have geometry designed to inhibit removal of blade 12 from head 14. In particular, one or more recesses 34 may be formed within side surfaces 30, 32 and configured to receive corresponding locking features of head 14. Recesses 34 may have opposing ends 36, 38 that are angled outward and configured to engage or provide clearance for the locking features, respectively. It is contemplated that the angular orientation of ends 36, 38 may be the same or different, as desired. A pair of shoulders 40 may protrude from side surfaces 30, 32, at a common location between recesses 34 and base end 22. Shoulders 40 may be located a particular distance away from recesses 34 and function as end stops for head 14 during assembly (see FIGS. 1A-1C). In some embodiments, a shape, size, and/or position of shoulders 40 may also be used to determine an identity of blade 12 and/or to locate blade 12 during a cutting process, if desired.

In some embodiments, an accessory engagement feature (e.g., an eyelet) 41 may be formed at tip end 24 and configured to engage a separately purchased accessory (e.g., a key ring). In these same embodiments, eyelet 41 may function as an additional or alternative locating feature used during cutting of shank 18, if desired. For example, a center of eyelet 41 may be precisely located a distance d from shoulders 40 and/or from base end 22 (e.g., about 0.7-0.8 inches from shoulders 40). Although tip end 24 is shown as having a generally curved outer periphery that enhances rigidity of head portion 16, it is contemplated that head portion 16 could alternatively have an angled or square outer periphery if desired.

One or more identification indices may be formed within or otherwise applied to (e.g., printed onto, stamped into, or adhered to) head portion 16 and used to identify blade 12 as a particular one of a plurality of known types of key blades. In the disclosed example, two indices are shown, including a first index 42 and a second index 44. Indices 42, 44 may take any form known in the art for relaying information regarding the identity of blade 12, and indices 42, 44 may be the same or different. For example, index 42 may be a type of index readable by a key duplication technician and still visible after head 14 is assembled to blade 12. In the same example, index 44 may be a type of index that is machine readable and visible only before and/or during cutting of shank 18 (i.e., index 44 may be located at a center of where head 14 is to be installed). Examples of different types of indices include alpha-numeric symbols (see index 42 in FIGS. 1A-2A), bar codes (see index 44 in FIGS. 1A-2A), data matrices, QR codes, etc. Although the depicted blade 12 includes indices 42, 44 located at only one side (i.e. only at primary surface 26), it is contemplated that indices 42, 44 could be located at both sides and/or at other positions, if desired. As will be explained in more detail below, index 42 may be used for manual selection and/or manual identity confirmation of a particular key blade 12, while index 44 may be used to complete a sales transaction and/or to automatically confirm identity and automatically make notches 49 in blade 12 within a fabrication module.

In some embodiments, shank 18 may have a thickness different than a thickness of head portion 16. In these embodiments, a step 54 (shown only in FIG. 2C) may be located at transition region 20. This step may be the result of a first type of blade 12 having either its head portion 16 or its shank 18 milled thinner after formation through the stamping process discussed above. That is, blades 12 may need to have a common thickness at head portion 16 to properly receive a common head 14, but blades 12 of different key types may have shanks 18 with a thickness that is the same or different (i.e., thicker or thinner). In situations where shank 18 is required to be thicker than the common head portion thickness, all of blade 12 may be stamped from a thicker material and then head portion 16 may be machined thinner to the common thickness. In contrast, in situations where shank 18 is required to be thinner than the common head portion thickness, all of blade 12 may be stamped from material having the common head thickness, but then shank 18 may be machined thinner. In other words, after stamping of different blades 12, some blades (e.g., the most commonly used blades 12) may be ready for notching and/or milling without further change, while other blades 12 may need to have their head portions 16 or their shanks 18 machined to be thinner, depending on the requirements of the corresponding locks. But in general, head portions 16 may have the same thickness when formation of blade 12 is complete. It is contemplated that, in some applications, a length of blade 12 may also need to be shortened during the duplication process.

Head 14, in the embodiments of FIGS. 1A-1C, is a subassembly of two substantially identical head components 14a oriented in opposition to each other. As shown in FIGS. 3A-3C, each head component 14a may include a primary surface 56 and a side surface 58 that is substantially perpendicular to primary surface 56. When two head components 14a are placed together in opposite orientation relative to each other (i.e., with primary surfaces 56 facing each other and side surfaces 58 facing each other), a cavity 60 (shown only in FIG. 3C) may be formed that is configured to slidingly receive head portion 16 of blade 12. One or more connecting features may be associated with each head component 14a and configured to engage corresponding features in the mating head component 14a, thereby maintaining connection between head components 14a. For example, one or more pins 62 may protrude at one edge of primary interior surface 56 and be received within one or more corresponding bores 64 located at an opposing edge of primary interior surface 56. Accordingly, when two head components 14a are pressed together, four pins 62 (one located at each corner of primary surface 58) may enter four bores 64. In some embodiments, removal of pins 62 from bores 64 may be inhibited to thereby prevent unintended disassembly of head 14. Pins 62 may be inhibited from removable by way of an interference fit, an adhesive, or another mechanism known in the art.

In other embodiments, head 14 is a single-piece integral component having many features in common with the two head components 14a described above. In these embodiments, the single-piece head 14 includes two primary surfaces 56, and two side surface 58 that are substantially perpendicular to primary surfaces 56 to form cavity 60. In this arrangement, no subassembly is required and no corresponding connecting features (i.e., pins 62 or bores 64) are formed within head 14.

In either of the two-piece or single-piece embodiments of head 14, a first end 66 of head 14 may be slid over tip end 24 of blade 12 and pushed toward shank 18. Two steps 68 may be formed at first end 66 (e.g., one step 68 within each head component 14a) and configured to engage shoulder 40 of blade 12 (see FIGS. 1A-1C), thereby positioning head 14 at a desired location along blade 12. Two tangs 70 may be located at a second end 72 of head 14 (e.g., one tang 70 within each head component 14a) and configured to deflect out of the way of blade 12 (i.e., out of cavity 60) during insertion and then return to a normal position (shown in FIGS. 1A-1C) within recesses 34 of blade 12, thereby inhibiting removal of head 14 from blade 12. Each tang 70 may have a proximal end near a center of head 14, and a distal end that protrudes toward second end 72 at an inward angle. The angle of recess end 36 (referring to FIG. 2A) may allow for a secure seating of tang 70 without binding (see FIGS. 1A-1C), while the angle of recess end 38 may provide clearance for the inward intrusion of tang 70. In this configuration, the only way that head 14 could be removed from blade 12 would be to cause buckling of tangs 70, which would require significant force. In some embodiments, there may not be sufficient space within cavity 60 for tangs 70 to buckle, making removal of head 14 even more difficult, if not impossible, without destruction of head 14.

In the disclosed embodiment, head 14 is injection molded from a plastic material. Accordingly, head 14 (e.g., each head component 14a) may have features that facilitate this fabrication method and/or material. For example, a pocket 74 may be formed at a location between bores 64 (if bores 64 are present). Pocket 74 may help to keep all walls of head 14 at about the same thickness, thereby reducing the formation of voids or uneven surfaces during molding. It is contemplated that pocket 74 may be omitted, if desired. It is also contemplated that head 14 could be fabricated from other materials and/or through other processes.

Head 14 may also include features that improve use of key assembly 10. For example, head 14 may include one or more friction-enhancing features, such as raised bumps 76 at an outer surface 78. These features may help to reduce the likelihood of a customer's hand slipping during use of key assembly 10. Head 14 may also have a smooth, rounded periphery that helps to reduce snagging. Head 14 may be fabricated in a variety of colors and/or shapes.

Figure 4:
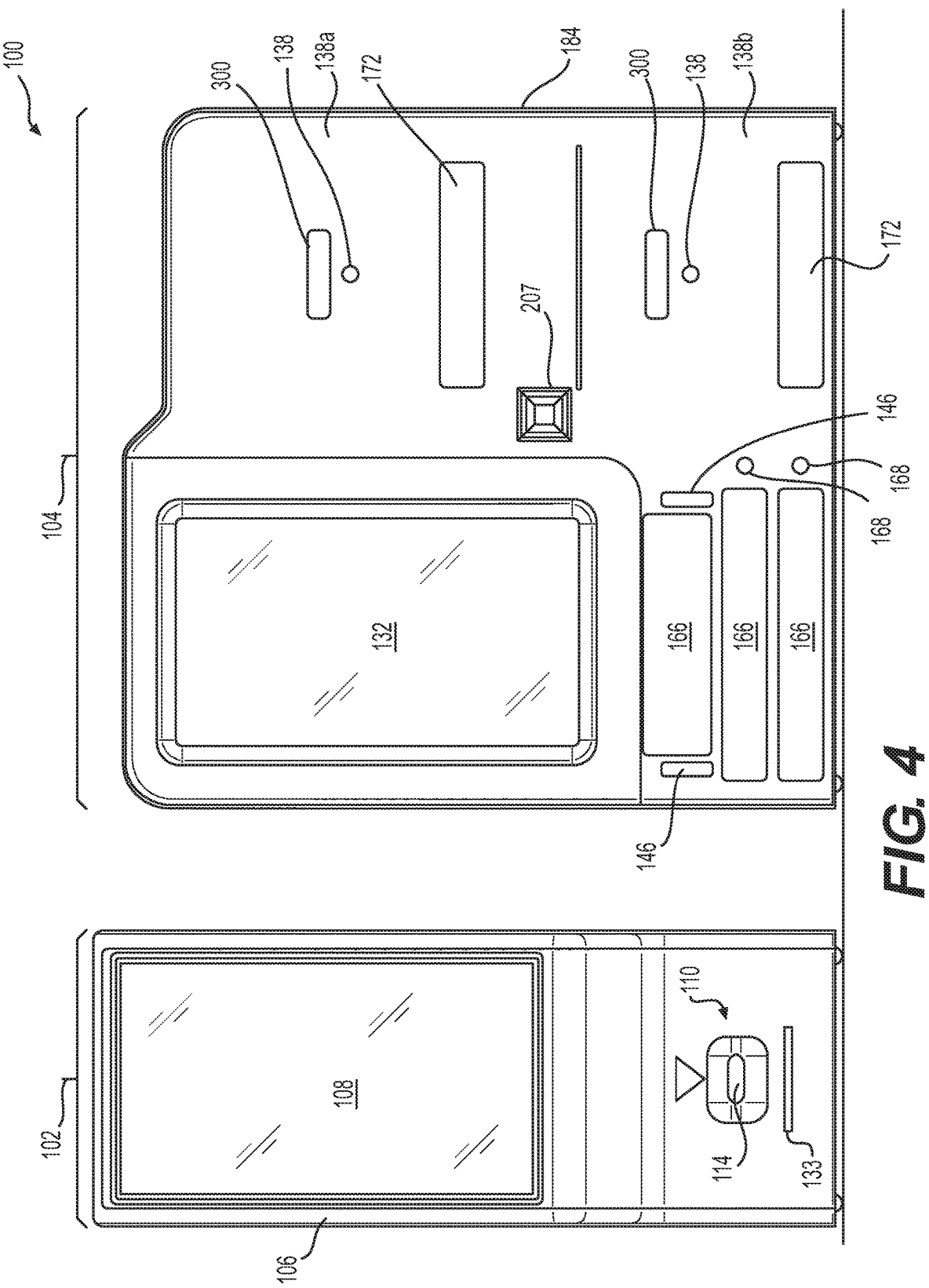
FIG. 4 is a front view illustration of an exemplary disclosed duplication machine that can be used in conjunction with the key blade of FIGS. 2A-2C.

FIG. 4 illustrates an exemplary key making machine 100 that can be used to create within key blade 12 a new bitting pattern or a copied bitting pattern of an existing key, prior to insertion of blade 12 into head 14. Machine 100 may be generally modular and include, among other things, at least one identification module 102, and at least one fabrication module 104 in communication with one or more identification modules 102. Each identification module 102 may be configured to detect, identify, and/or measure distinguishing characteristics of the existing key inserted therein. Each fabrication module 104 may be configured to retrieve or otherwise receive a particular blade 12 or a conventional key blank associated with the identified master key, to machine the key blade 12 to match a desired profile (e.g., of the existing key), and to dispense blade 12 after fabrication is complete. Identification module 102 may be positioned near (e.g., adjacent and facing in the same or another direction as) fabrication module 104 or remote from fabrication module 104. Alternatively, identification module 102 and fabrication module 104 may be co-located within a common housing. Identification module 102 may communicate with fabrication module 104 via wired and/or wireless means. Data associated with the duplication process may be communicated to and from one or both of identification and fabrication modules 102, 104, as necessary.

Figure 5:
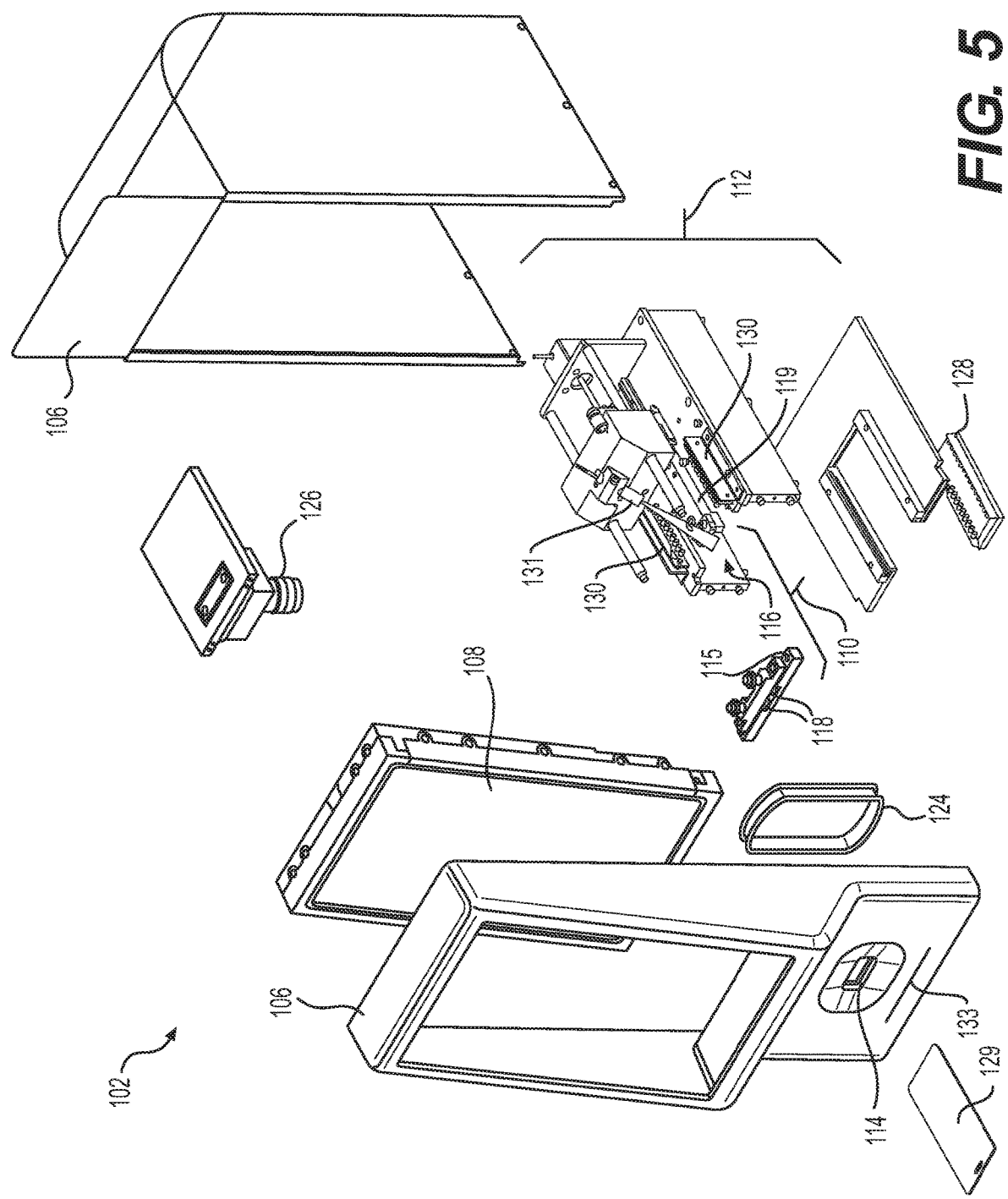
FIG. 5 is an exploded view illustration of an exemplary disclosed identification module that may form a portion of the duplication machine of FIG. 4.

As shown in FIG. 5, identification module 102 may include a housing 106 that at least partially encloses a customer interface 108, a key receiving assembly 110, and an imaging system 112. Customer interface 108 may be configured to receive instructions from a customer regarding a desired duplication process, receive payment from the customer for completion of the duplication process, and/or provide status information and options to the customer regarding an ongoing duplication process. Key receiving assembly 110 may be configured to receive an existing key in a particular orientation (e.g., lying horizontally with the shank thereof pointed inward toward the module) and at a particular location. Imaging system 112 may be configured to generate images of the existing key (or portions thereof) after it is received within key receiving assembly 110, and to direct information associated with the images to fabrication module 104 (referring to FIG. 4).

Customer interface 108 may allow the customer to input instructions, make selections, and/or answer questions regarding a desired duplication event. The instructions may include, for example, a number of duplicate blades to be produced, a desired pick up time, a customer's name, a desired delivery address, blade identification information, etc. The selections may be associated with a desired graphic design to be formed into or otherwise applied to head 14 (e.g., to be printed onto a separately purchased key head at an adjacent and connected printer—not shown), a desired color of the duplicate key's head, a desired key head shape to be used with the duplicate key, a desire for duplication information to be stored for future reference, etc. The questions may include for example, a make, model, and/or year of an associated car that the master key corresponds with; a type and/or brand of lock to which the master key belongs; and whether the master key is a transponder key. The instructions, selections, and/or questions, as well as corresponding responses, may be communicated visually, audibly, and/or tactilely, as desired. For example, customer interface 108 may include a display screen (e.g., a touch screen), a key board, a mouse, a light pen, a speaker, and/or a microphone that both communicates information to the customer as well as receives input from the customer. Information received via customer interface 108 may be directed to fabrication module 104 for further processing, and fabrication module 104 may provide queues and/or responses to the customer via interface 108. It is contemplated that other interface devices may also be used.

In some embodiments, customer interface 108 may also include a means for receiving payment from the customer. These means may include, for example, a coin operated mechanism, a bill receiver, a credit card reader, and/or a receipt reader (e.g., a barcode reader configured to recognize a previous payment having already been received at another location and/or time). The means for receiving payment may be located anywhere within housing 106 of identification module 102, and be capable of directing signals associated with the payment to fabrication module 104 or elsewhere for further processing.

An exemplary embodiment of key receiving assembly 110 is shown in FIGS. 5, 6A, and 6B. As is shown in these figures, an opening (e.g., a transversely elongated slot) 114 may be formed in a front panel of housing 106 to provide customer access to key receiving assembly 110, a fixed head guide 115 may be positioned at opening 114, and a movable tip guide 116 may be positioned behind head guide 115. Each of these components may cooperate to receive the existing key as it is inserted by a user shank-first through opening 114. Transverse sides 118 (shown in FIGS. 5 and 6B) of head guide 115 may be beveled inward toward a general center such that, as the existing key is inserted, the head of the existing key may engage sides 118 and be urged toward the center (i.e., toward greater alignment with tip guide 116). The existing key may be inserted until the head of the master key engages both sides 118 to about the same degree. In most applications, this engagement should result in the existing key being lengthwise aligned with tip guide 116 within a desired angle of about 0-10°, and more specifically within about 0-4°. Tip guide 116 may slide along a rail 119, from opening 114 inward to a desired imaging position. Tip guide 116 may be manually moved by the customer through insertion of the existing key, although it is contemplated that in some applications an additional actuator (not shown) may be used to draw in and/or position the existing key, if desired.

In situations where the existing key is nonconventional (e.g., includes blade 12 but not head 14), extra care may be required during insertion of the existing key into key receiving assembly 110. In particular, without head 14, more care may be required to insert blade 12 in a centered manner such that blade 12 is generally aligned with tip guide 116 (i.e., since no head may be available to engage the beveled sides 18 of head guide 115). In some applications, a temporary head (not shown) may be selectively coupled with blade 12 for use with key receiving assembly 10, and thereafter removed. In other applications, an additional guide insert may need to be connected to key receiving assembly 110 to properly align blade 12 with tip guide 116.

As shown in FIGS. 6A and 6B, tip guide 116 may include a cup-like recess 120 configured to receive a tip of the existing key when the shank of the key is inserted through opening 116. Although shown as being generally curved (e.g., with a radius and/or depth that inhibits skewing of the key shank to angles greater than about 10°), it is contemplated that recess 120 could take another shape (e.g., a cone, square, or rectangular shape), if desired. Tip guide 116 may be tilted downward toward the shank of the master key during insertion to reduce a likelihood of the master key slipping out of recess 120. In one example, tip guide 116 may be tilted downward at an angle α in the range of about 2-3°. A slot 122 may be located at a transverse center of recess 120, at an end opposite rail 119. Slot 122 may form a window into recess 120. A biasing element (e.g., a spring, a cylinder, an elastomeric band, etc.—not shown) may be connected to tip guide 116 and configured to bias tip guide 116 toward opening 114 in housing 106, thereby further helping to retain the tip of the existing key within recess 120.

The window formed by slot 122, as will be described in more detail below, may provide access for light from imaging system 112 to pass through recess 120 (see FIG. 5) and form a shadow outline (i.e., a silhouette) of the existing key at a receiver located at an opposing side of tip guide 116. In one embodiment, an end of recess 120 may be sloped at the window to correspond with an incident angle of the light, so as to not block the light as it passes through recess 120. It is contemplated that key receiving assembly 110 may be oriented in different ways, so as to receive a generally horizontal key (i.e., a key inserted by the customer in an orientation where the primary flat surfaces are generally horizontal) or a generally vertical key. Accordingly, the light may pass through the window and recess 120 to the receiver in a top-to-bottom direction, in a bottom-to-top direction, in a left-to-right direction, and/or in a right-to-left direction, depending on the configuration of the particular identification module 102.

In some applications, a transponder sensor 124 may be associated with key receiving assembly 110 (e.g., cloning coils may be mounted to housing 106 at or around slot opening 114—see FIG. 6B). Transponder sensor 124 may be used to detect the presence of a transponder within the head of the existing key upon insertion into tip guide 116. Data associated with a detected transponder may be directed to fabrication module 104 (referring to FIG. 4) for further processing. It is contemplated that transponder sensor 124 could alternatively be located together with fabrication module 104, if desired.

Returning to FIG. 5, imaging system 112 may be a vision-based system employing one or more sources of visible and/or invisible light, and the receiver discussed above. The receiver may be, for example, a camera 126 that is located to any side of the master key during operation. Camera 126 may be configured to capture images of the existing key, while the light sources are selectively turned on and off. For example, imaging system 112 may include one or more "back lights" 128 configured to shine directly or indirectly toward the existing key from a side opposite (e.g., from below) camera 126. Camera 126, at this time, may capture the silhouette image of the existing key showing an exterior edge outline of the key and a location of reference features of the key (e.g., of shoulders of the key and/or of the tip seen through slot 122 of tip guide 116—see FIG. 6B). In another example, imaging system 112 may include one or more "side lights" 130 configured to shine light onto the existing key, one at a time, from an oblique side angle. During activation of each side light 130, camera 126 may be used to generate an image of the existing key showing an interior edge outline of notches 49 milled into the flat planar of the blades center section 50 (referring to FIG. 2C).

In some applications, imaging assembly 112 may also or alternatively include a laser 131 configured to scan the existing key (e.g., one or more critical sections of blade 12) while camera 126 generates one or more transverse stripe images of channels 52. If multiple stripe images are generated, the images may then be compiled into one or more comprehensive images of channels 52 within the existing master key. Signals generated by laser 131 within identification module 102 may be used to further identify blade 12 and/or be directed to fabrication module 104 for further processing.

In addition to determining the bitting profile of the existing master key and the geometry of channels 52 within the key, it can be important to also measure a thickness of the existing master key. And this may be done in a number of different ways. For example, laser 131 (or a different laser—not shown) could create a stripe image across a particular portion of the existing master key (e.g., across shoulders 40 and/or shank 18) and also across a reference feature (not shown) built into key receiving assembly 110 (e.g., into head guide 115, tip guide 116, or another portion of assembly 110). The thickness of the existing master key could then be determined by comparing the laser stripe thickness on the reference feature with the laser stripe thickness on the existing master key. In another example, the same or another laser (e.g., the laser of a fixed laser micrometer or similar photo device) could be placed at a side of key receiving assembly 110 to generate a laser beam directed over a cross-section of the existing master key. A receiver located opposite the laser may be configured to receive the laser beam and determine, based on blockage of a portion of the beam by the existing master key, the thickness of the key. In yet another example, the thickness of the existing master key may be measured via a commercially available linear variable differential transformer (LVDT—not shown). In a final example, one or more mirrors (not shown) may be situated to allow camera 126 to capture a side profile of the existing master key at the same time (or at a different time) that camera 126 captures the backlight image described above. Other ways of determining the thickness of the existing master key may also be possible. Signals indicative of the master key thickness may then be used to further identify blade 12 and/or be directed to fabrication module 104 for further processing.

It should be noted that, in some applications, a particular existing key may have geometry (e.g., a bitting profile, channel geometry, and/or side-mill pattern) that differs from side-to-side. In these applications, it may be necessary for the existing key to be withdrawn after imaging of the first side, and then re-inserted through slot 114 for imaging of the second side. Both images may then be directed to fabrication module 104 for use in separately cutting the two sides of an associated blade 12. Alternatively, a single imaging process may capture both sides of blade 12 to avoid the need to withdraw and reintroduce blade 12 into identification module 102.

During some key making processes, it may be possible for contaminates to be introduced into imaging module 102. For example, lint, dirt, and debris can be stuck to the existing key when inserted through opening 114, and it might be possible for these contaminates to fall off of the existing key while the key is inside imaging module 102. If the contaminates were to fall onto portions of imaging system 112 (e.g., onto back light 128), the image subsequently captured of the existing key could be distorted. For this reason, imaging module may be equipped with a contaminate containment device 129 configured to capture the dislodged material and block the material from back light 128). In the embodiment shown in FIG. 5, contaminate containment device 129 may include a plate or cover fabricated from a translucent material (e.g., from polycarbonate acrylic or glass) that is positioned vertically between key receiving assembly 115 and back light 128. Contaminate containment device 129 may be removable from imaging module for cleaning purposes. For example, contaminate containment device 129 may be slid out of imaging module 102 via a slot 133, wiped clean, and replaced.

Figure 7:
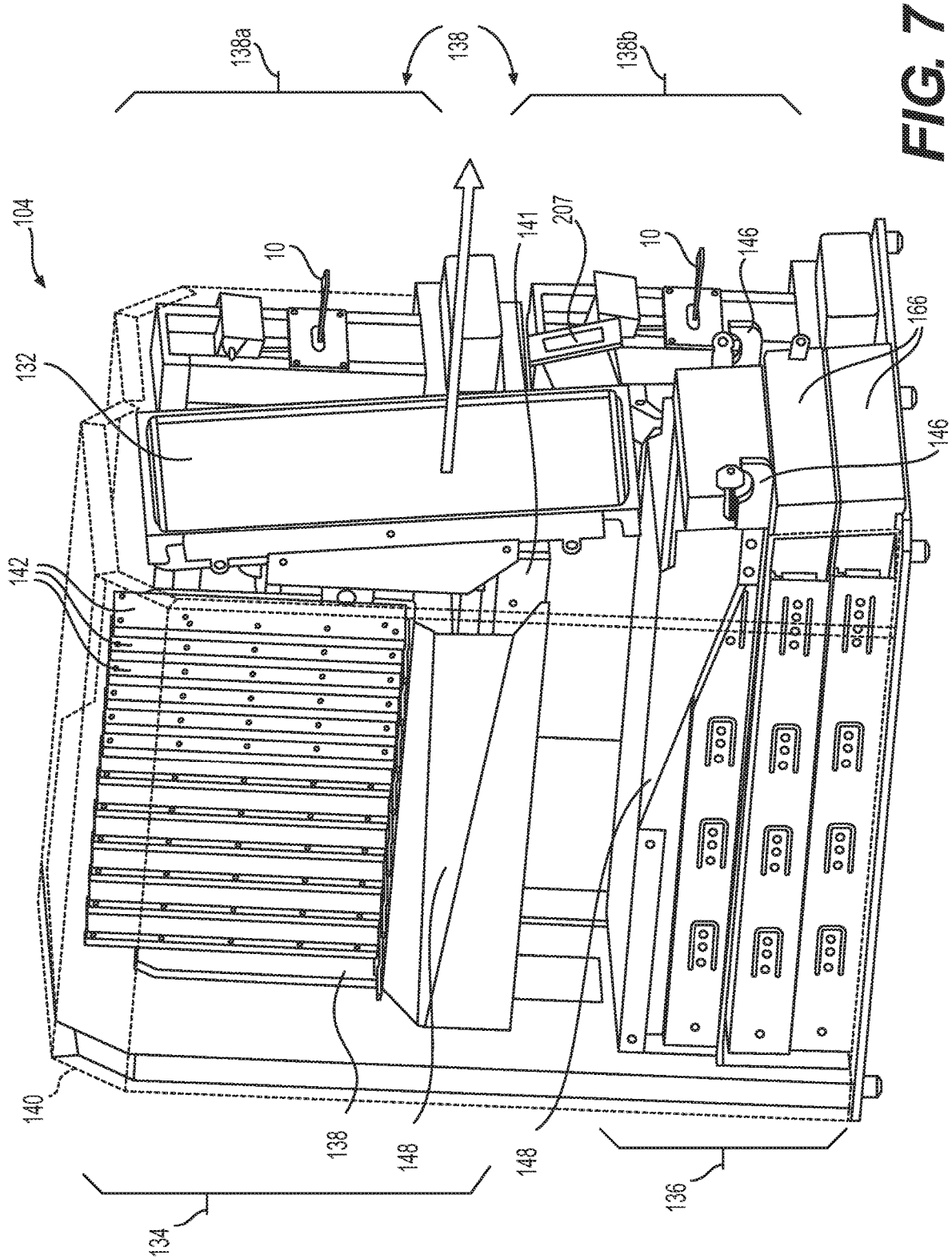
FIG. 7 is an isometric illustration of an exemplary disclosed fabrication module that may form a portion of the duplication machine of FIG. 4.

FIG. 7 illustrates an exemplary embodiment of fabrication module 104. As can be seen in this figure, fabrication module 104 may itself be modular, and include an associate interface 132, a dispensing system 134, a manual inventory system 136, and one or more fabrication systems 138 stored within a common housing 140. Associate interface 132 may be configured to receive instruction from an operator of key making machine 100 (e.g., from a store associate or other user) regarding a desired key making process and confirmation of payment received from the customer for completion of the process, and to provide status information and/or options to the associate regarding an ongoing process. Dispensing system 134 may contain and selectively dispense blank key blades 12 (i.e., key blades 12 not yet having notches 49 or channels 52 cut into them) and conventional key blanks (i.e., key blanks having a uniquely shaped head portion not intended to receive head 14) for use in the key making process. Manual inventory system 136 may also contain blank key blades 12 and/or conventional key blanks for use in the process. However, the blank key blades 12 and conventional key blanks contained within manual inventory system 136 may generally be different than the blank key blades 12 and conventional key blanks contained within dispensing system 134. The blank key blades 12 and conventional key blanks within manual inventory system 136 may be manually retrieved by the store associate. For the purposes of describing fabrication module 104, both key blades 12 and conventional key blanks will be generically referred to as "key blanks" in this disclosure. Fabrication system(s) 138 may selectively be used to make desired patterns of bitting notches 49 within the key blanks based on identification data received from identification module 102 (referring to FIG. 4).

Fabrication system(s) 138 may generally be isolated from the other systems of fabrication module 104 (e.g., separated from associate interface 132, dispensing system 134, and manual inventory system 136 by way of walls within housing 140), such that debris generated from the associated cutting processes does not contaminate the other systems. In fact, in some embodiments, fabrication system(s) 138 may be completely separate from associate interface 132, dispensing system 134, and/or manual inventory system 136. For example, fabrication system(s) 138 could be stand-alone modules, or connected to only associate interface 132. In either of these configurations, dispensing system 134 may be omitted if desired.

Associate interface 132 may allow the associate to input instructions, make selections, and/or answer questions regarding a desired duplication event. The instructions may include, for example, a number of duplicate blades to be produced, a desired pick up time, a desired delivery address, blade identification information, etc. The questions may include for example, a make, model, and/or year of an associated car that the duplicate key is to be associated with; a type and/or brand of lock to which the key will belong; and whether the duplicate key is to be a transponder key. The instructions, selections, and/or questions may be communicated visually, audibly, and/or tactilely, as desired. For example, associate interface 132 may include a display screen (e.g., a touch screen), a key board, a mouse, a light pen, a speaker, and/or a microphone that both communicates information to the associate as well as receives input from the associate. Information received via associate interface 132 may be directed to dispensing and fabrication systems 136, 138 for further processing, and these systems may provide queues and/or responses to the associate via interface 132. It is contemplated that other interface devices may also be used.

In the disclosed embodiment, associate interface 132 may be physically connected to dispensing system 134 and configured to be periodically removed from housing 140. For example, associate interface 132 may be rigidly mounted to a front of dispensing system 134, and dispensing system 134 may ride on a sliding drawer mechanism 141. In this configuration, the associate may slide associate interface 132 and dispensing system 134 together from housing 140 by pulling on associate interface 132. This access may allow the associate to service and/or restock dispensing system 134, while also conserving space within housing 140. It is contemplated that associate interface 132 and/or dispensing system 134 could be mounted within housing 140 in another manner, if desired.

Figure 8:
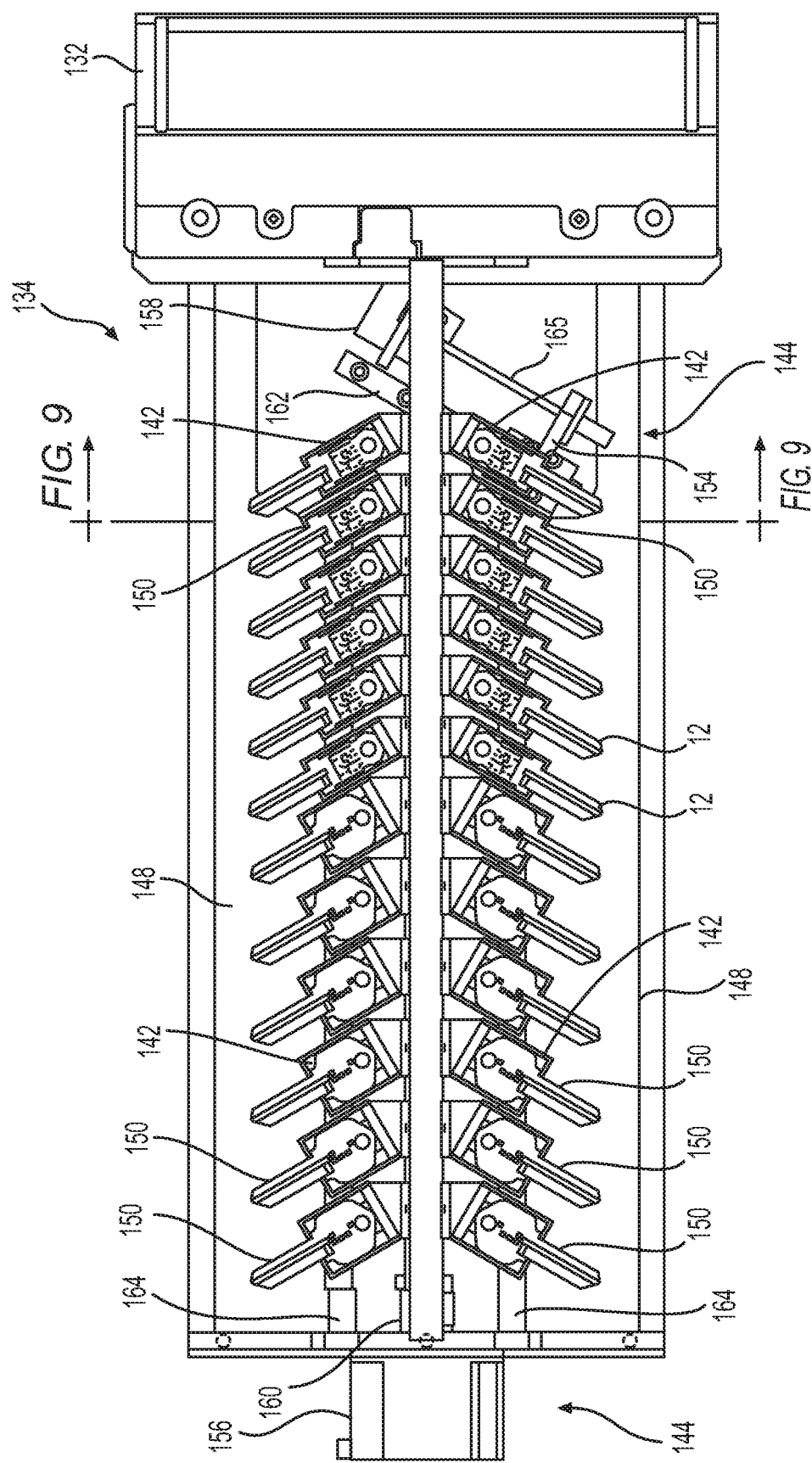
FIG. 8 is a top view illustration of an exemplary disclosed dispensing system that may form a portion of the fabrication module of FIG. 7.
Figure 9:
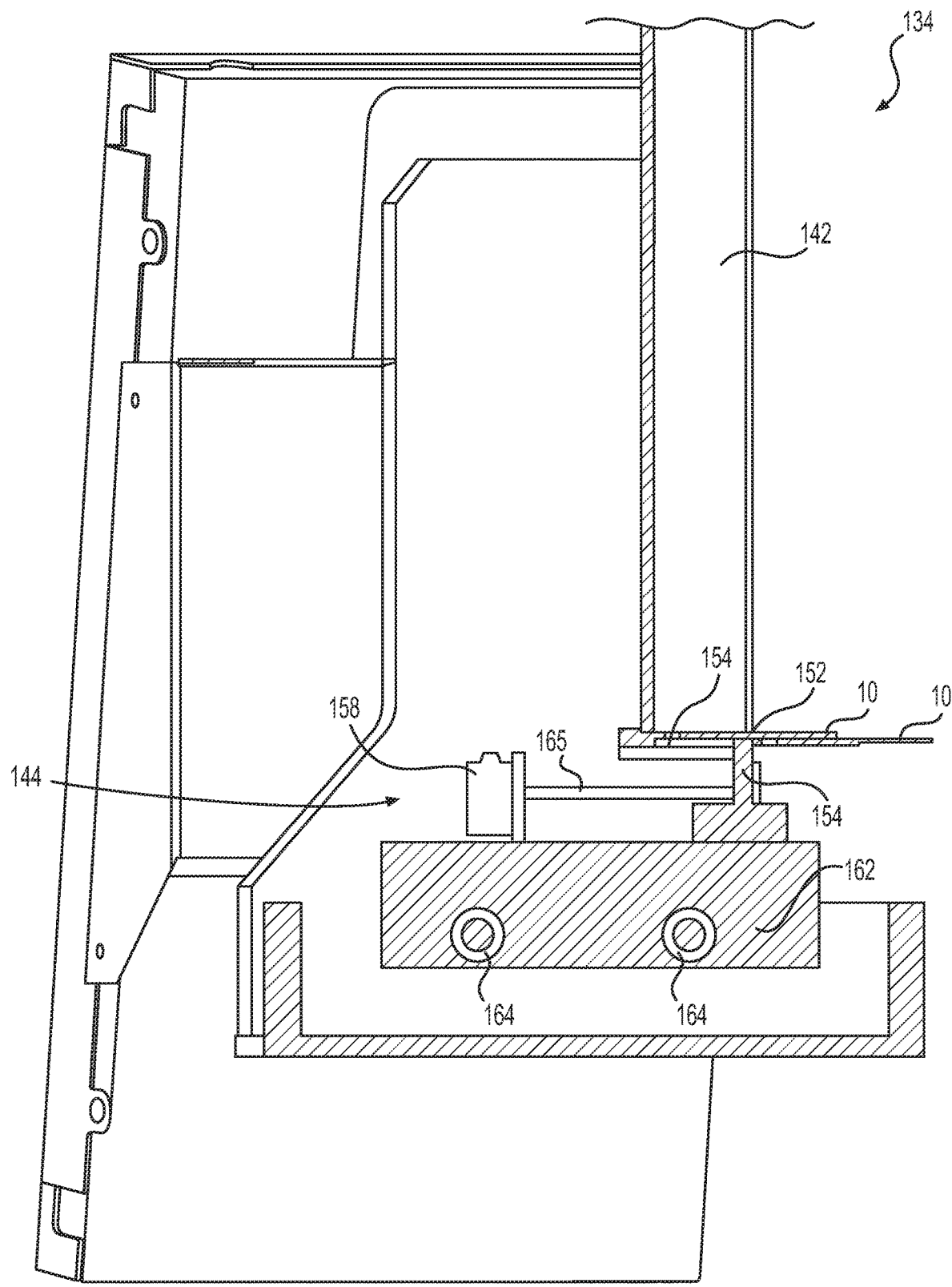
FIG. 9 is a cross-sectional end view illustration of the dispensing system of FIG. 8.

As shown in FIGS. 7-9, dispensing system 134 may include, among other things, a plurality of different chutes 142, a common actuator 144 associated with the different chutes 142, one or more receptacles 146, and one or more ramps 148 leading from actuator 144 to receptacle(s) 146. Each chute 142 may be configured to hold a plurality of a particular type of key blank (e.g., either a blank blade 12 or a conventional key blank) and a particular color, style, and/or size of key blank (e.g., blade #66, blade #67, or blade #68—referring to FIGS. 1A-1C). Actuator 144 may be configured to push a selected key blank from the bottom of a stack of blanks stored within a particular chute 142 and onto ramp 148. After being pushed onto ramp 148, the blanks may slide under the force of gravity, head-first, into receptacle 146. It is contemplated that ramp 148 could be replaced with a conveyor belt or other transport mechanism, if desired.

Chutes 142 may be arranged within dispensing system 134 into one or more different rows, each row containing any number of the same or different chutes 142 and being associated with the same actuator 144. For example, the embodiment of FIG. 8 shows chutes 142 arranged into two rows at opposing sides of actuator 144, with at least two different types of chutes 142 in each row (e.g., chutes 142 associated with blank blades 12 and chutes 142 associated with conventional key blanks). Chutes 142 may be configured to hold only the head portion 16 of each blade 12 or a conventional key head, with the shanks 16 extending outward through a longitudinal slot 150. In general, all chutes 142 associated with blades 12 may have the same configuration and size, as all blades 12 have the same configuration and size of head portion 16. It is contemplated, however, that each chute 142 associated with a conventional key blank could have a different size, if desired, to accommodate the unique head configurations of conventional keys. It is also contemplated that each chute 142 could be provided with an insert (e.g., a plastic molded insert) that is custom fit on its interior to a particular conventional key blank and includes a common exterior, such that a universal chute 142 could be utilized for all key blanks.

Chutes 142 may be angled such that shanks 16 extend away from the front of dispensing system 134 (i.e., away from associate interface 132 and receptacles 146). With this configuration, as individual blanks are pushed out of their respective chutes 142 along the direction of their shanks by actuator 144, the blanks may land inside ramps 148 with their heads or head portions pointing toward the front of dispensing system 134. In this manner, the blanks may slide head-first into receptacles 146 for convenient retrieval by the store associate.

As shown in FIG. 9, each chute 142 may include a horizontal opening 152 at a lower most point that is configured to allow only the first blank in a corresponding stack of blanks to be pushed out of the particular chute 142, while the remaining blanks are prevented from being dislodged. An end wall 153 may cap off a lower end of chute 142 to inhibit the blanks from falling completely through chute 142. Actuator 144 may include a finger 154 configured to slide through a slot formed within end wall 153 and through horizontal opening 152 to engage only the head of a desired blank. As finger 154 moves outward along the shank direction of the desired blank, the blank will eventually be pushed out of horizontal opening 152 of chute 142 and fall into ramp 148 (referring to FIG. 7). In some embodiments, chute 142 is a single piece component, wherein end wall 153 is integral with the side walls of chute 142. In other embodiments, however, chute 142 only includes extruded side walls, and end wall 153 is fabricated as a separate component and subsequently connected to the side walls. Other configurations may also be possible.

As shown in FIGS. 8 and 9, actuator 144 may be equipped with multiple motors configured to move finger 154 in at least two directions. For example, actuator 144 may include a first motor 156 and a second motor 158. First motor 156 may be located at an end of dispensing system 134 opposite associate interface 132 and configured to turn a lead screw 160 connected to a carriage 162. Carriage 162 may be mounted to slide on one or more rails 164 that extend in a length direction of dispensing system 134, as lead screw 160 is turned to draw in or push away carriage 162. The rotation of first motor 156 may be controlled to selectively cause finger 154, which may be supported by carriage 162, to align with a particular chute 142. Once aligned with the particular chute 142, second motor 158 may be selectively rotated to turn an additional lead screw 165 that connects carriage 162 to finger 154. The rotation of second motor 158 may cause finger 154 to push desired key blanks from the particular chute 142 onto ramp 148. The displaced key blank may then slide down ramp 148 and into receptacle 146. In the disclosed embodiment of FIG. 7, two receptacles 146 are shown, one associated with each row of chutes 142. It is contemplated, however, that both rows of chutes could alternatively discharge keys into a common receptacle 146, if desired.

In the disclosed embodiment, dispensing system 134 holds about thirty different types of key blanks within different chutes 142, with about one-hundred key blanks of each type in each chute 142. It has been found that this configuration can generally accommodate 80-90% of the demand for duplicated keys. It is contemplated, however, that multiple chutes 142 could alternatively house the same types of key blanks (e.g., the most commonly requested key blanks), if desired. In general, the chutes 142 located closest to the front of dispensing system 134 may contain the blanks in highest demand. In this manner, actuator 144 may need to move finger 154 a shorter distance for most duplication events, which may increase the speed at which keys can be duplicated. In addition, these chutes 142 may be easier to load than chutes 142 located further to the back of dispensing system 134. Dispensing system 134, once filled with three-thousand keys (30 chutes with 100 blanks per chute) may be relatively heavy. And when dispensing system 134 is withdrawn from the housing of fabrication module 104, a moment may be created that tends to cause fabrication module 104 to tip forward. In order to prevent tipping of fabrication module 104, fabrication module 104 may be designed to be substantially balanced when dispensing system 134 is pulled out and completely filled (i.e., a weight of fabrication module 104 may create a counter-moment that substantially balances the moment created by dispensing system 134).

Manual inventory system 136 (referring to FIG. 7) may be configured to house key blanks that are less commonly demanded by a customer of duplication machine 100. In the disclosed embodiment, manual inventory system 136 may include any number of drawers 166 configured to hold different key blanks (i.e., blank key blades 12 and/or conventional key blanks). One or more of drawers 166 may be divided into different sections, each section holding a different type of blank. In one application, fabrication module 104 (i.e., associate interface 132) may direct the store associate to a particular key blank within drawers 166. For example, based on the identity of the master key inserted into identification module 102, a visual indicator (e.g., a light—see FIG. 4) 168 may activate to direct the associate to a particular drawer 166 containing the desired key blank. In some instances, additional indicators may be located inside of drawers 166, functioning to direct the associate to a particular key blank therein. In an alternative application, the location and identity of the desired key blank may be shown on associate interface 132. For example, an image of the different drawers 166 may be shown, with the particular drawer 166 holding the desired key blank being illuminated or highlighted. In addition, a map or grid image of an interior of the particular drawer 166 could also be shown, with the exact location of the desired key blank within the particular drawer 166 being indicated. Associate interface 132 may also be able to inform the associate of the unique identifying index 42 visible on the desired key blank. Other means of directing the associate to a particular drawer 166 and/or to a particular location within the drawer 166 may be utilized, if desired. In addition, other means of storing the less-used key blanks could be implemented.

After retrieving a dispensed key blank from either receptacle 146 or from a particular one of drawers 166, the key blank may be inserted into one of fabrication systems 138 for formation of notches 49 therein. In the disclosed embodiment, fabrication module 104 has two different fabrication systems 138, including a wheel fabrication system 138a and a milling system 138b. It is contemplated, however, that fabrication module 104 could alternatively include only wheel fabrication systems 138a, only milling systems 138b, or only a single system of either type, as desired.

Depending on the identification of the existing key inserted into identification module 102, associate interface 132 may instruct the associate to insert the desired key blank into a particular one of wheel cutting and milling systems 138a, 138b. For example, if the desired key blank corresponds with an edge cut key (single or double), associate interface 132 may instruct the associate to insert the key blank into wheel fabrication system 138a. And in contrast, if the desired key blank corresponds with a milled key, associate interface 132 may instruct the associate to insert the key blank into milling system 138b. This instruction may be visual, for example shown on associate interface 132 and/or through illumination of lights 170 associated with each fabrication system 138 (see FIG. 4). A chip removal drawer 172 may be paired with each fabrication system 138 (e.g., located below) and provide a way to manually remove chips and debris generated by the duplication process.

Figure 10:
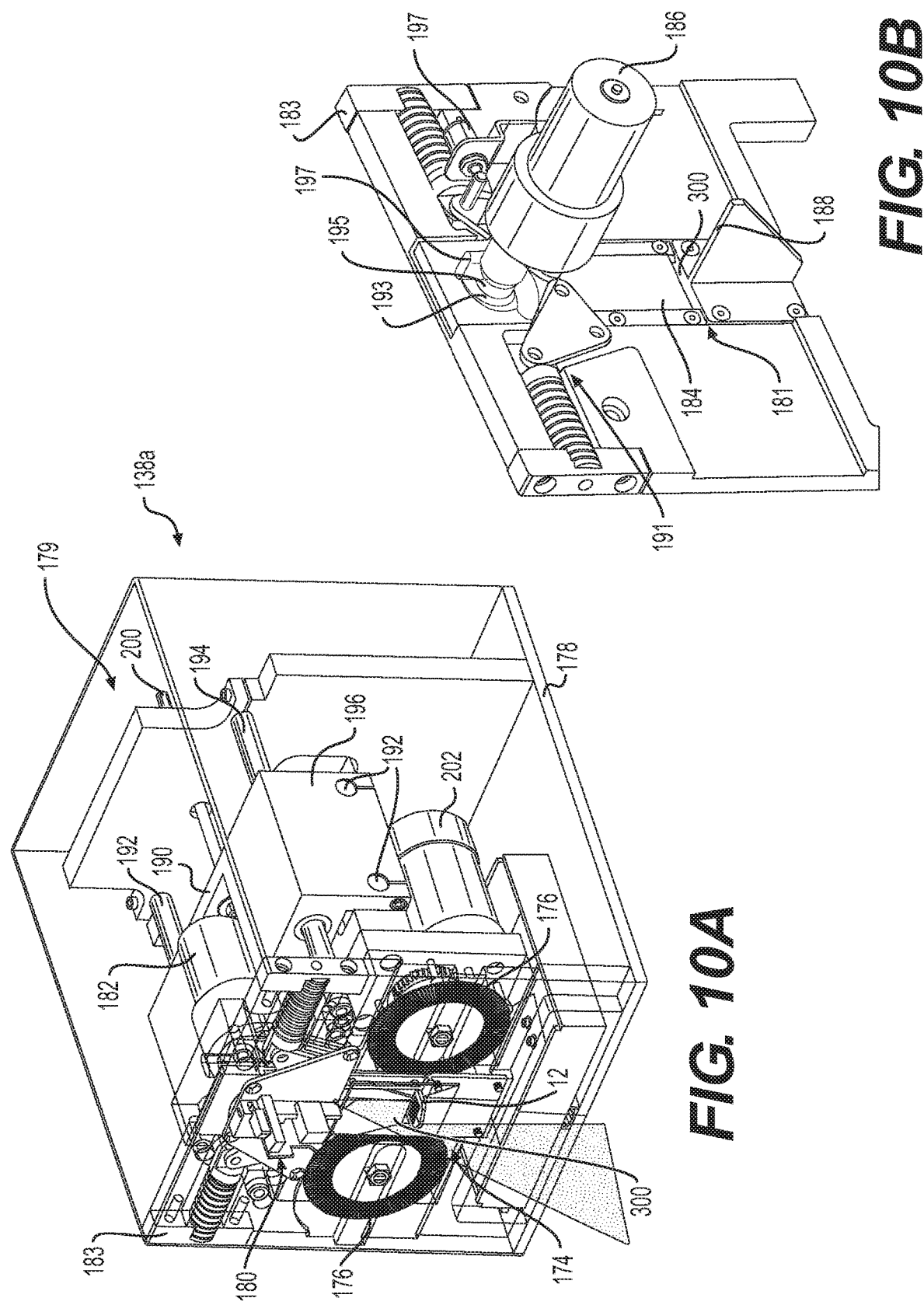
FIGS. 10A and 10B are isometric illustrations of exemplary disclosed cutting system that may form a portion of the fabrication module of FIG. 7.

An exemplary wheel fabrication system 138a is shown in FIGS. 10A and 10B. Wheel fabrication system 138a may include, among other things, a receiving unit 174, one or more cutting wheels 176 mounted to a base platform 178 by way of a movable overhead gantry 179, and an identity confirmation unit 180. The key blank retrieved by the associate may be inserted through an opening 300 in a front panel 183 of fabrication module 104 (see FIG. 4) and into receiving unit 174. While being received by receiving unit 174 (e.g., while shank 18 is passing through opening 300), identity confirmation unit 180 may identify the received key blank and confirm that it is the desired type of key blank corresponding to the master key inserted into identification module 102. After identity confirmation by unit 180 and placement by receiving unit 174 of the key blank at a desired location, cutting wheel(s) 176 and gantry 179 may be selectively activated to produce desired features within the key blank.

Figure 11:
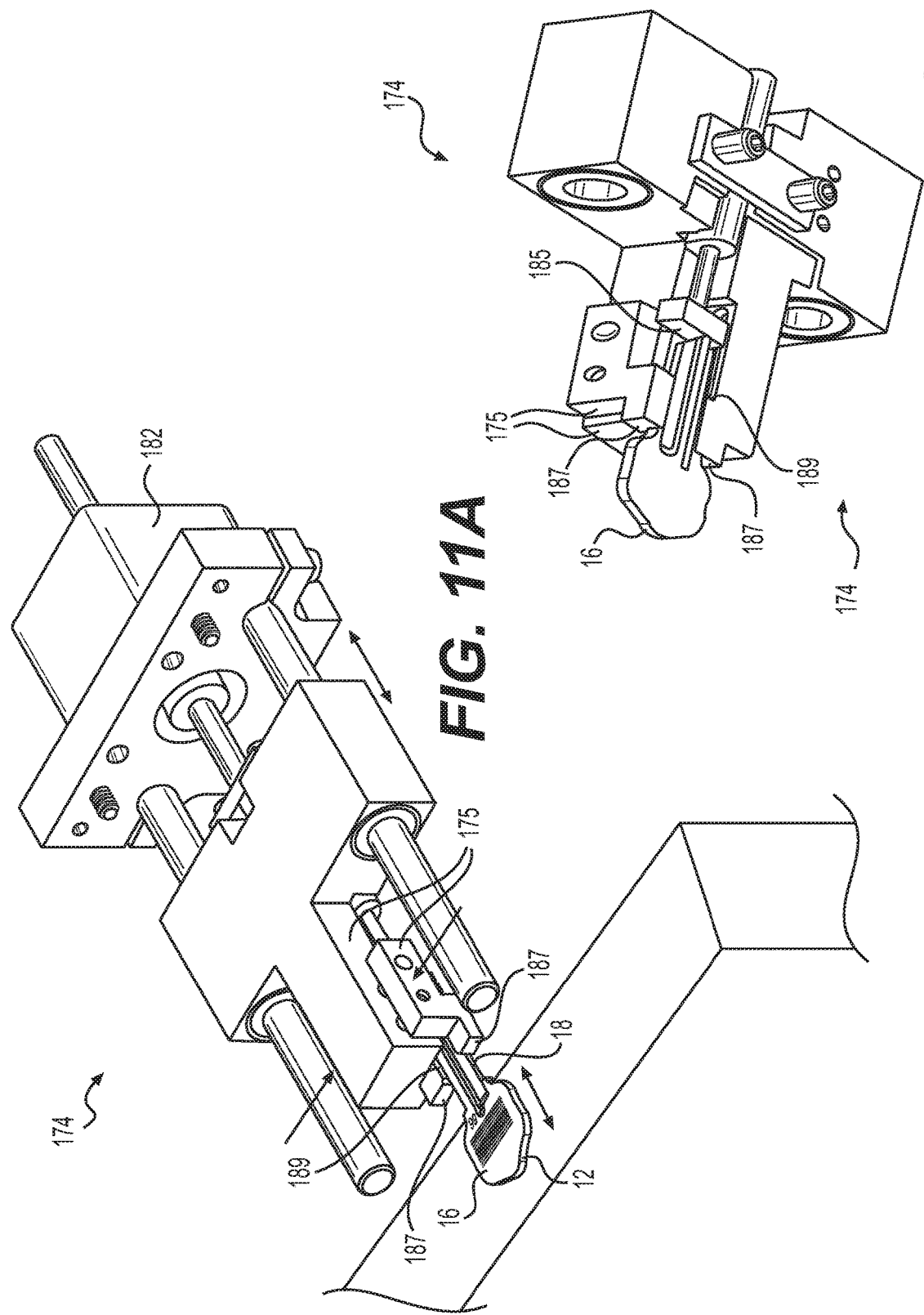
FIGS. 11A and 11B are isometric illustrations of an exemplary disclosed receiving unit that forms a portion of the cutting system of FIG. 10.

Receiving unit 174 may have any configuration known in the art for receiving, clamping, and/or positioning the desired key blank relative to cutting wheels 176. In one embodiment shown in FIGS. 10B, 11A, and 11B, receiving unit 174 includes jaws 175 (referring to FIGS. 11A and 11B) that are spring-biased toward each other to sandwich the key blank there between, and a clamp 181 (referring to FIG. 10B) movable from an open position to a closed position to secure the key blank once positioned. Jaws 175 may have positioning features, for example a side shelf configured to engage edge 48 of shank 18 (referring to FIG. 2A) and mechanically push shank 18 into alignment against a base member 189, an end stop 185 configured to engage the distal tip of shank 18, and/or features 187 configured to engage base end 22 and/or shoulders 40 of head portion 16 when the key blank is completely inserted. In some embodiments, a sensor may be associated with end stop 185 (e.g., end stop 185 may be the plunger of a potentiometer) and end stop 185 may be movable as the key blank is inserted. In this way, a length of the key blank may be measured as the key blank is inserted, the length being subsequently used as a way to confirm identity and/or proper placement of the key blank. It is contemplated, however, that end stop 185 and/or the sensor associated with end stop 185 may be omitted, if desired. For example, fabrication system 138a could be configured to only cut notches 49 into key blanks having a known length and, in these situations, it may not be necessary to measure the length of the key blank.

Jaws 175 may be connected to an actuator 182 (e.g., to a motor/lead screw arrangement-see FIG. 11A) that is configured to move jaws 175 and the key blank in/out through opening 300, and side-to-side relative to the rest of wheel fabrication system 138a. Actuator 182 may, itself, be mounted to gantry 179 (referring to FIG. 10A) such that movement of gantry 179 results in further movement (left/right and in/out) of the key blank relative to identity confirmation unit 180 and clamp 181. Once the key blank has been placed at a desired cutting location, clamp 181 may be actuated to clamp down on only head portion 16. Thereafter, jaws 175 may be completely withdrawn from the key blank by actuator 182, exposing shank 18 to cutting wheels 176.

In the disclosed embodiment shown in FIG. 10B, clamp 181 includes a vertically elongated member (also known as an anvil) 184 that is selectively moved downward by a motor 186 to press the key blank against a support 188. In this embodiment, motor 186 includes a cam lobe 193 connected to a shaft thereof and positioned within an opening 195 of anvil 184. As motor 186 rotates, the shape of cam lobe 193 may cause anvil 184 to raise or lower, thereby clamping or releasing the key blank. Anvil 184 may be spring biased toward a closed position, for example by way of lever assemblies 191 connected to opposing sides of anvil 80, and moved toward the open position by motor 186. One or more sensors 197 may be associated with clamp 181 to monitor the position of anvil 184 and/or motor 186, as desired.

The placement of the key blank prior to clamping may be controlled based on, among other things, an image of head portion 16 (referring to FIG. 2A) captured by identity confirmation unit 180. In particular, as the key blank is drawn into wheel fabrication system 138a, particular features of the key blank may be imaged, recognized, measured, and compared to an expected location of those features. For example, a location of base end 22 (e.g., a gap between base end 22 and the outer end surface of jaws 175) and/or shoulders 40 of head portion 16 may be recognized by identity confirmation unit 180 and compared to the expected location of those features. And actuator 182 and gantry 179 may be caused to continue to move the key blank until the measured location is about equal to the expected location. If the difference between the measured and expected locations is too great and/or a time spent attempting to reduce the difference is too great, associate interface 132 may instruct the associate to manually reposition the key blank.

Additionally or alternatively, identity confirmation unit 180 may search for index 44 so as to confirm and/or drive placement of the key blank prior to clamping. Specifically, because index 44 may be located at only one side of head portion 16, detection of index 44 may provide confirmation unit 180 with the orientation of the key blank as it was inserted. That is, if no index is detected, confirmation unit 180 may determine that the key blank was inserted upside down. And if index 44 is detected, confirmation unit 180 may conclude that the key blank was inserted properly. Accordingly, identity confirmation unit 180 may determine that the orientation of the key blank, as inserted by the associate, is correct based on whether index 44 is recognized. And after recognition, identity confirmation unit 180 may compare the data linked with index 44 to expected data associated with the desired key blank. If index 44 is not found and/or the data associated with index 44 does not correspond with the expected data of the desired key blank, then associate interface 132 may alert the associate that the key blank has been inserted upside down and/or that an incorrect key blank has been inserted. Thereafter, actuator 182 may be caused to push the key blank back out through opening 300.

Once index 44 has been detected, the identity of the inserted key blank confirmed, and the image thereof captured or otherwise deciphered, identity confirmation unit 180 may selectively affect operations of fabrication system 138a based on the identity. In particular, confirmation unit may trigger unique positioning of the key blank, unique operation of clamp 181, unique operation of cutting wheels 176, and/or other unique operations of fabrication system 138a based on the identity. For example, for a first type of key blank (e.g., for a first size, shape, and/or material) inserted into fabrication system 138a, the key blank may need to be placed at a first position relative to anvil 184 prior to clamping, anvil 184 may need to press on the key blank with a first force, cutting wheels 176 may need to spin at a first speed, and/or the feed rate of cutting wheels 176 may need to be set at a first feed rate. And for a second type of key blank, the key blank may need to be placed at a second position relative to anvil 184, anvil 184 may need to press on the key blank with a second force, cutting wheels 176 may need to spin at a second speed, and/or cutting wheels 176 may need to be set at a second feed rate.

Identity confirmation unit 180 may be substantially isolated from debris generated during cutting of the key blanks. Specifically, identity confirmation unit 180 may be located at a side of front panel 183 opposite cutting wheels 176, such that identity confirmation unit 180 may be substantially sealed off from the cutting and milling processes. This isolation may help to prevent the relatively delicate components of identity confirmation unit 180 from being contaminated with debris. In addition, this location may help the identity confirmation process to continue while head 16 of the key blank remains outside of front panel 183 during insertion of shank 18.

As illustrated in FIG. 10A, cutting wheels 176 may be rigidly mounted to each other a horizontal distance apart by way of a yoke 190 (e.g., cutting wheels 176 may hang from yoke 190), and movable relative to base platform 178 by way of gantry 179. Gantry 179 may include, among other things, two sets of parallel guide rails 192, 194 that provide for movement of cutting wheels 176 in two directions, referred to as the X- and Y-directions, respectively. Guide rails 194 may be fixedly connected to base platform 178, while guide rails 192 may be mounted to a carriage 196 that rides on guide rails 194. Yoke 190 may be supported by carriage 196. One or more motors (not shown) may be connected to carriage 196 and yoke 190 by way of one or more lead screws 200, and selectively actuated to cause movement of carriage 196 and yoke 190 along the respective guide rails 192, 194. A separate motor 202 may be connected to selectively drive each cutting wheel 176, and both motors 202 may be mounted to slide with yoke 190 along guide rails 192. Actuator 182 associated with jaws 175 may also be rigidly connected to yoke 190 and/or carriage 196.

Wheel fabrication system 138a may be used to make notches 49 in one or both edges of blade 12 (see FIGS. 1A and 1B). During cutting of notches 49, one of motors 202 is selectively activated at a time, lead screw 200 is driven to move cutting wheel 176 into and out of shank 18 along its length. The amount of movement in the X-direction at a given position in the Y-direction may be controlled based on the pattern of existing notches 49 measured in the master key by identification module 102. For a singled edge-cut key, only one of motors 202 may be activated to rotate a single cutting wheel 176 at one side of blade 12. For a dual edge-cut key, both motors 202 may be selectively activated to rotate both cutting wheels 176. However, during cutting of a dual edge cut key, only one of motors 202 may be used at a time to make notches 49. In other words, a first of motors 202 and cutting wheels 176 may be used (i.e., moved in and out of the X-direction while traversing the length of shank 18 along the Y-direction) to make notches 49 in a first beveled edge 46, and then a second of motors 202 and cutting wheels 176 may be used to make the same or different notches 49 in a second beveled edge 46.

It is contemplated that motors 202 and cutting wheels 176 may be used in an alternating manner to produce single edge-cut keys. In particular, if the same motor 202 and cutting wheel 176 were always used to produce all single edge-cut keys, that motor 202 and cutting wheel 176 would wear out much quicker than the remaining motor 202 and cutting wheel 176. Accordingly, the use of motors 202 and cutting wheels 176 may be alternated between production of single edge-cut keys, thereby ensuring substantially equal wear of motors 202 and cutting wheels 176.

It is also contemplated that some fabrications systems 138a may have only one cutting wheel 176, while other fabrication systems 138a may include the two cutting wheels 176 described above. In particular, some systems may be designed to cut only a single edge into a key blank, while other systems may be designed to cut dual edges. In fact, it may be possible for a single fabrication module 104 to include both types of systems. For example, a particular fabrication module 104 could include one or more fabrication system 138a configured to cut single edges located together with one or more fabrication system 138a configured to cut dual edges; multiple single edge systems 138a only; or multiple dual edge systems only. Any configuration may be possible.

Figure 12:
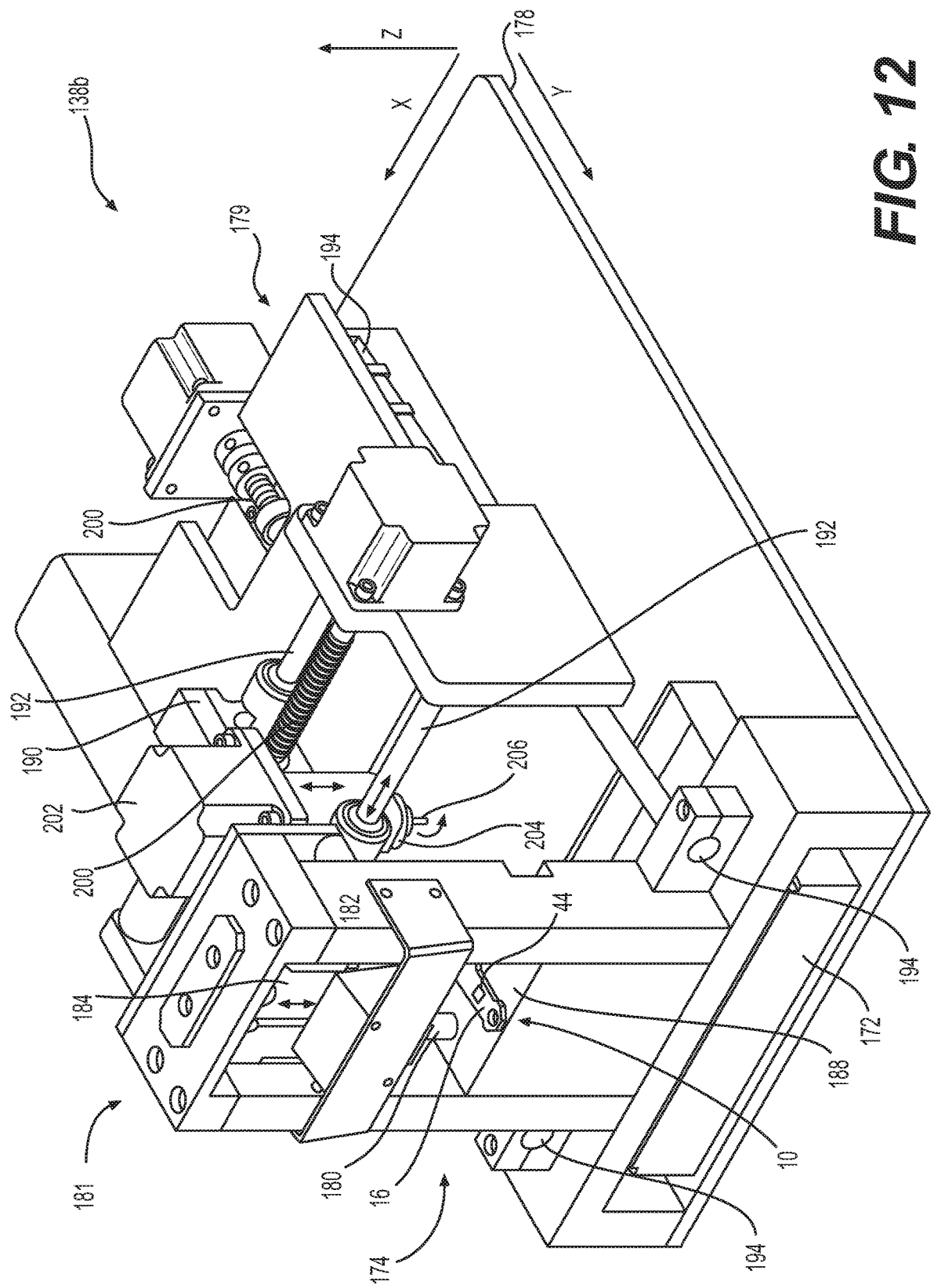
FIG. 12 is an isometric illustration of another exemplary disclosed cutting system that may form a portion of the fabrication module of FIG. 7.

An exemplary milling system 138b is shown in FIG. 12. Like wheel fabrication system 138a, milling system 138b may also include receiving unit 174, gantry 179 connected to base platform 178, and identity confirmation unit 180. However, in contrast to wheel fabrication system 138a, milling system 138b may have a single milling head 204 connected to yoke 190 and driven by a single motor 202, instead of two cutting wheels 176 driven by separate motors 202. In this configuration, milling head 204 may be selectively moved along guide rails 192, 194 in the X- and Y-directions during milling of notches 49 within center portion 50 of blade 12. In addition, a cutting bit 206 held within milling head 204 may be selectively raised and lowered in a Z-direction to vary a depth of notches 49, if desired. After identity confirmation by unit 180 and placement of the key blank at a desired location by receiving unit 174, milling head 204 and gantry 179 may be selectively activated to produce desired features within the key blank.

In some embodiments, the master key that the customer wishes to duplicate may be embedded with a transponder that enables activation of an associated lock (e.g., an ignition lock in a vehicle). In these situations, it may be desirable to code a new duplicate key (i.e., a new key have a blade notched by duplication machine 100) to match the master key with the same transponder code to ensure that the duplicate key functions in the same manner as the master key. As described above, the transponder code in the master key can be detected and read at sensor 124 within identification module 102. And after cutting notches 49 into shank 18 of the appropriate key blank, the same code may be cloned within the transponder of the new key at a cloning pocket 207. In the disclosed embodiment, cloning pocket 207 is shown in FIG. 4 as being located within the front panel of fabrication module 104. However, it is contemplated that cloning pocket 207 could alternatively be located within identification module 102 or separate from both of identification and fabrication modules 102, 104. It is also contemplated that transponder sensor 124 and cloning pocket 207 could be combined at a single location, if desired.

Figure 13:
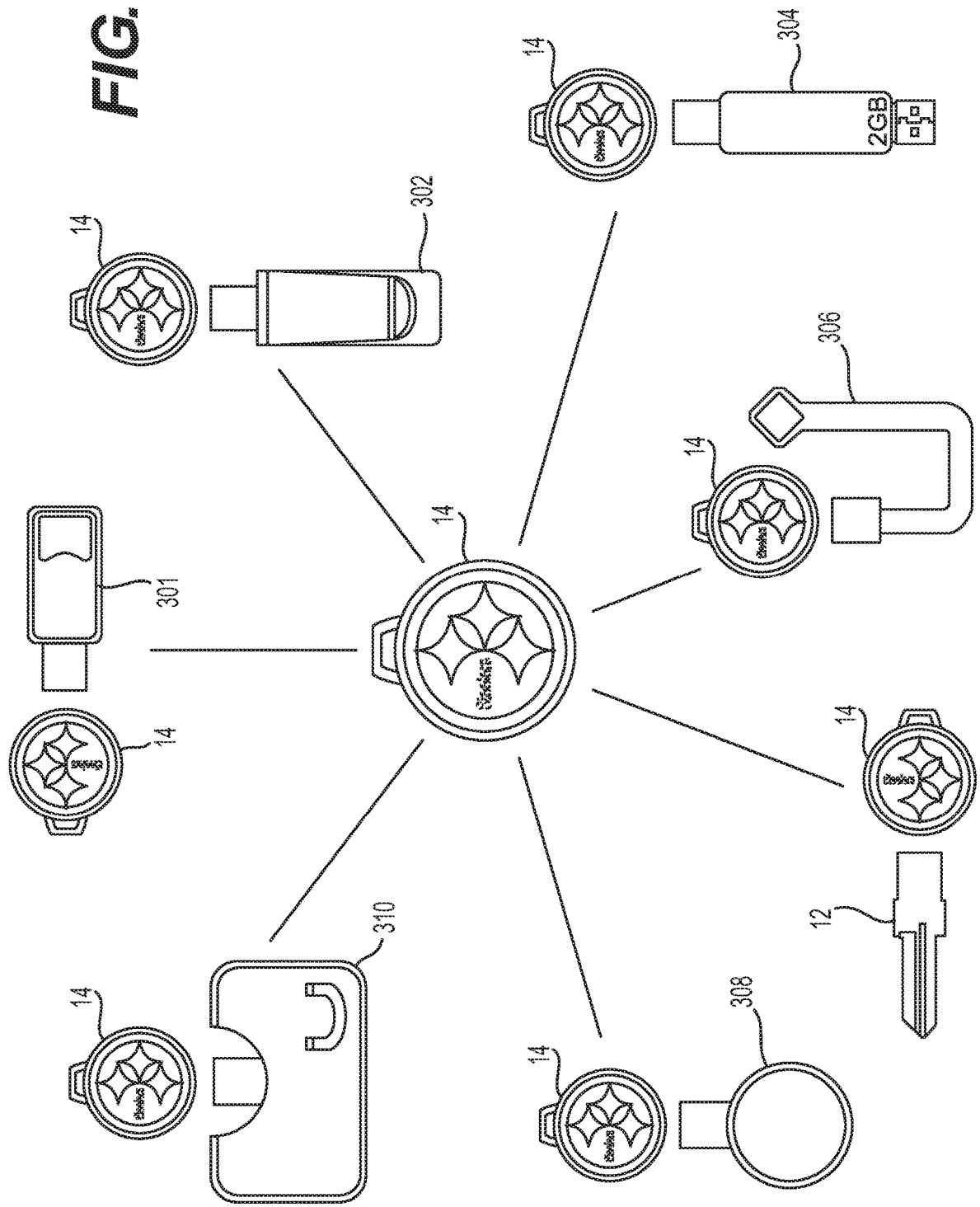
FIG. 13 is a top view illustration of exemplary disclosed accessories that may be associated with the key assemblies of FIGS. 1A-1C.

FIG. 13 shows alternative uses of head 14. In particular it may be profitable to design head 14 to receive items other than just blade 12. For example, accessory items such as a bottle opener 301, a money clip 302, a portable media drive 304, a purse hook 306, a key ring 308, and a refrigerator magnet 310 may be fabricated with geometry similar to the geometry of head portion 16 such that these items can accept and lock together with head 14 described above. It is contemplated that these accessory items may be purchased along with head 14 and blade 12 at duplication machine 100, or elsewhere within the store hosting duplication machine 100. In one embodiment, head 14 may even be customized at duplication machine 100, for example head 14 may be printed on, etched, milled, applied with an adhesive backing, etc. to bear a desired shape, symbol, logo, and/or image.

INDUSTRIAL APPLICABILITY

The disclosed key duplication machine 100 may be utilized to duplicate a single edge-cut key, a dual edge-cut key, and a side-milled key from the blank blade 12 of the disclosed key assembly 10 or from a conventional key blank. The disclosed duplication machine 100 may be easy to use and produce a reduced number of mis-cuts. An exemplary operation of the disclosed key duplication machine 100 will now be described with reference to FIGS. 1-13.

To begin the duplication process, a customer or sales associate may insert an existing key of any configuration through slot 114 of identification module 102. In some embodiments, this action may be the very first action taken in the process and, by initiating this action, wake (i.e., trigger activation of) the associated machine 100. For example, a sensor may be associated with tip guide 116 and configured to generate a signal based on initiation of guide movement, duration of movement, and/or cessation of movement, this signal then being used to wake machine 100 and/or trigger imaging assembly to capture images of the existing key. In other embodiments, however, the customer and/or associate could alternatively make selections associated with and/or make payment for an intended duplication process via customer interface 108 located at identification module 102, thereby waking machine 100 (e.g., the machine could be triggered by insertion of a credit card into the machine).

As the existing key is inserted through slot 114 into identification module 102, the head of the existing key may engage head guide 115 (if the existing key has a head) while the tip of the existing key engages tip guide 116. At this time, movement of the existing key in through slot 114 may cause the tip of the existing key to push tip guide 116 away from the slot 114. This motion may continue until the head of the existing key engages beveled sides 118 of head guide 115 by about the same amount. This engagement may cause the head of the existing aster key to align with tip guide 116 in preparation for imaging.

After the shank of the existing key is inserted into identification module 102, imaging system 112 may be triggered to capture one or more images of only the shank of the existing key. The images, as described above, may include a backlight image, one or more sidelight images, and a laser scan image. These images may show a location of the tip of the key, a profile of the shank, and a location of shoulders at a base of the key's head (if shoulders are present).

In some embodiments, once the existing key is fully inserted into the identification module 102, the transponder sensor 124 may be triggered to detect the presence of a transponder within the head of the existing key. It is contemplated that this action may be taken before image capturing, simultaneously with image capturing, and/or after image capturing, as desired. This detection may also include, in some applications, capturing of transponder data. The transponder data may include, among other things, an identification code; a make, model, serial number, etc. of the transponder; and/or other information known in the art. The transponder detection and/or data may be used at any point throughout the fabrication process to manually, semi-autonomously, and/or autonomously program a universal transponder located within a head 14 for use with the newly-cut key blank.

Based on the backlight image (i.e., based on the silhouette of the master key), it may be determined if the existing key is an edge-cut key, a side-mill key, or in some embodiments simply a key that cannot be duplicated with machine 100. In one example, these determinations may be made based on the edge profile of the existing key, as captured in the backlight image. Specifically, if the edge profile is a straight profile, then it may be classified as a side-mill key. Otherwise, it may be classified as an edge cut key. In another example, the master key may be identified as a particular one of a plurality of known keys (e.g., key #66) and, based on the identification, reference a lookup map stored in memory to determine the class of key (edge-cut or side-mill) that it is and if it can be duplicated by machine 100. The backlight image, when the existing key is an edge cut key, may also be used to measure a profile of the bitting edge(s) of the key. It is contemplated that, in some embodiments, the step of determining the type of key inserted into identification module 102 may be omitted, and duplication machine 100 may be capable of cutting only one type of key (e.g., only edge cut keys).

When it is determined that the existing master key is an edge-cut key, the laser scan image may be used to identify and/or measure the channel profile of the master key (i.e., the shapes, sizes, and/or locations of channels 52) in a manner known in the art. In some embodiments, capturing of the laser scan image may only be made after determination that the existing master key is an edge-cut key. In other embodiments, the laser scan image may always be captured.

When it is determined that the existing master key is a side-mill key, the sidelight images may be used together to determine the side-mill profile of the existing key. In particular, each side light may be selectively turned on, one at a time, to capture an inner edge profile of notches 49 at center portion 50 (referring to FIG. 1C). Specifically, by shining the side light across the surface of center portion 50, a shadow may be created within the notched area and the edge of the notched area opposite the particular side light 130 should be illuminated. By capturing an image at this time, a pattern at a surface of center portion 50 along notches 49 becomes visible. When this is done twice, once with each different side light 130, two separate notch pattern images can be created. The two separate images may then be combined into one comprehensive profile of the inner notch geometry of the side-mill key that can be measured and subsequently reproduced within the corresponding key blank. As with the laser-scan image described above, it is contemplated that the sidelight images may always be captured by identification module 102 or only captured in response to classification of the existing key as a side-mill key.

Dispensing system 134 may then be triggered to dispense an appropriate key blank or, alternatively, an associate may be instructed (e.g., via associate interface 132) to retrieve the appropriate key blank from manual inventory system 136. When dispensed automatically, the key blank may be retrieved from receptacle 146 by the associate. In either situation, the associate may then insert the retrieved key blank into the appropriate one of openings 300 in front panel 183 of fabrication module 104 (see FIG. 4). The associate may be instructed as to which opening 300 (i.e., which system 138a or 138b) should be used through associate interface 132 and/or via lights 170.

As shank 18 of the appropriate key blank is being inserted by the associate into jaws 175 of the desired fabrication system 138 (either wheel fabrication system 138a or milling system 138b), the key blank may be mechanically aligned by the insertion, and the identity and orientation of the key blank simultaneously confirmed. The identity and orientation may be confirmed through recognition and interpretation of index 44 by confirmation unit 180 as shank 18 passes through slot 300 into jaws 175. If an inconsistency is detected at this point in time, the process may be prematurely halted.

It is contemplated that the identity of the key blank inserted into fabrication system 138 may be confirmed without use of index 44, if desired. For example, it may be possible to determine the identity of some key blanks based on characteristics of their heads (e.g., an outer profile, an eyelet shape, etc.). It is also contemplated that these characteristics could be used in conjunction with index 44 and/or the measured length of shank 18 (i.e., the length measured via end stop 185 of the potentiometer), if desired.

Once the correct key blank has been properly placed within jaws 175 and the identity and orientation confirmed, actuator 182 may move the key blank into a desired position relative to clamp 181 and the corresponding fabrication device(s) (i.e., cutting wheels 176 and/or milling head 204). Thereafter, motor 186 may release anvil 184, allowing anvil 184 to clamp down on only the head of the key blank. Once the key blank has been clamped in place, actuator 182 may withdraw jaws 175 from the now cantilevered key blank, thereby completely exposing shank 18. The fabrication process may then begin.

The fabrication process may include an edge-cutting process performed within wheel fabrication system 138a or a side-milling process performed within milling system 138b. In some instances, multiple surfaces of a particular key blank may be cut without the key blank having to be repositioned. In other instances, the key blank may need to be repositioned (e.g., flipped over) partway through the process so that additional surfaces may be cut. The repositioning may be performed manually. Once the cutting process has been completed, the key blank may be pushed back through opening 300 and manually retrieved by the associate.

In instances where blade 12 has been cut (as opposed to a conventional key blank), a separately purchased key head 14 may be applied by hand (i.e., without tooling) to head portion 16 of blade 12. In some applications, head 14 may first be customized. For example, a customer may be able to design, upload, and/or select a particular graphic to be printed (e.g., printed onto an adhesive film that is subsequently applied to the head), etched, sublimated, and/or molded into head 14. This customization may be performed via customer interface 108 at identification module 102, if desired. In addition, in circumstance where the existing key is a transponder key, a transponder head may be programed with the corresponding data before being connected to blade 12. This programming may take place within transponder pocket 206 described above.

Head 14, in most instances, may not be removed after being joined to blade 12. This may help to prevent unintentional disengagement during use of key assembly 10. It is contemplated, however, that this functionality may only be available with particular heads 14 (e.g., with heads that do not have expensive transponders, as it may be desirable to swap transponder heads between different blades 12 in mis-cut situations). Heads 14 (including transponders, if applicable) may be dispensed separately from blade 12 at the point of sale, or together from the same system and/or module. The customer or associate may assemble head 14 to blade after completion of the cutting process. Little or no skill may be required to properly push head 14 into place head portion-first over blade 12. In the disclosed embodiments, head 14 can be affixed at the point of sale without tools or glue.

It is contemplated that data associated with a particular duplication event may be stored for later use, if desired. For example, after completion of a first duplication event, the customer may desire that the associated identification of blade 12 and profile measurements of the existing master key be stored. Then at a later time, with or without the master key, the customer may be able to retrieve this stored data and then complete a second duplication event. It is also contemplated that the data associated with the first duplication event may be communicated to the customer, allowing the customer to store the data for use in the second event, if desired. This information could be communicated via a printout, an email, a text, etc.

Index 44 may be used to enable a sales transaction, in addition to facilitating cutting of the key blank to match the master key (i.e., in addition to confirming proper blank selection, proper orientation, and fabrication system parameter set up). In particular, information relating to the sales transaction (e.g., price, inventory, etc.) may be linked to the barcode of index 44. And before, during, or after the cutting process is complete, the associate may scan the barcode and use the information to charge a customer a corresponding fee.

It will be apparent to those skilled in the art that various modifications and variations can be made to the disclosed key making machine. Other embodiments will be apparent to those skilled in the art from consideration of the specification and practice of the disclosed key making machine. For example, it is contemplated that dispensing system 134 may be separated from fabrication module 104, if desired. In these embodiments, dispensing system 134 may be a stand-alone module or completely omitted. That is, retrieval of the desired key blank could be a completely manual process wherein the blank is selected by the associated from a display rack or other location. In another example, instead of duplication machine having two separate modules (i.e., the identification module and the fabrication module), it is contemplated that all components of these modules could be located within a common housing. It is intended that the specification and examples be considered as exemplary only, with a true scope being indicated by the following claims and their equivalents.

What is claimed is:

1. A key making machine, comprising:
   a housing;
   an identification system, wherein the identification system includes:
      a slot opening in the housing configured to receive the shank of an existing first key;
      a transponder sensor configured to detect the presence of a transponder within an existing second key and to read a transponder code associated with the detected transponder; and
      an imaging system comprising one or more light sources and one or more cameras, wherein the imaging system is configured to use a single camera to determine at least a channel profile of each side of the shank of the existing first key without withdrawing and reintroducing the existing first key in the slot;

a fabrication system, wherein the fabrication system is configured to:
receive a key blank that the identification system has determined to be associated with the existing first key based at least in part on the determined channel profile of each side of the existing first key; and
cut a bitting pattern into the received key blank that matches the bitting pattern of the existing first key;

a user interface associated with the housing,
wherein the user interface includes a touch screen, and
wherein the user interface is configured to provide status information to a user regarding a key duplication process involving the existing first key; and a credit card reader.

2. The key making machine of claim 1,
wherein the one or more light sources includes a back light;
wherein an image captured by the one or more cameras includes at least a backlight image; and
wherein the identification system is configured to determine whether the existing first key is an edge-cut key or a milled key based on the captured backlight image.

3. The key making machine of claim 1, wherein determining the channel profile of each side of the shank of the existing first key further comprises determining at least one characteristic selected from the group of characteristics consisting of the shape of a channel formed within the existing first key, the size of a channel formed within the existing first key, and the location of a channel formed within the existing first key.

4. The key making machine of claim 1, further comprising a dispensing system having a plurality of chutes within the housing to hold a plurality of key blanks of different types.

5. The key making machine of claim 4, wherein one or more of the chutes are configured to hold a particular type of key blank.

6. The key making machine of claim 4, wherein each of the chutes dispenses a key blank from a lower most opening that is configured to allow only a single blank to be dispensed at a time.

7. The key making machine of claim 1, wherein upon detection of the presence of a transponder within the existing second key, the user interface is further configured to receive input from a user via the touchscreen comprising at least one input selected from the group of inputs consisting of a make of an automobile associated with the existing second key, a model of an automobile associated with the existing second key, and a year of an automobile associated with the existing second key.

8. The key making machine of claim 1, wherein the user interface is further configured to receive input from a user via the touchscreen comprising a delivery address for a duplicated key that is to be fabricated at a location remote from the key making machine.

9. The key making machine of claim 1, wherein the key making machine is configured to generate a queue of key duplication events and transmit information associated with the queue to the user interface for display.

10. The key making machine of claim 1, wherein the user interface is configured to ask the user if the user wishes to store data associated with the key duplication event for later use.

11. The key making machine of claim 10, wherein the machine is configured to store the data.

12. The key making machine of claim 10, wherein the machine is configured to communicate the data associated with the key duplication event to a remote location.

13. The key making machine of claim 1, wherein the fabrication system is isolated from the identification system and the user interface such that debris generated by the fabrication system does not contaminate the identification system and the user interface.

14. The key making machine of claim 13, further including a chip removal drawer.

15. The key making machine of claim 1, wherein the user interface provides guidance to a user for key insertion through visual means.

16. The key making machine of claim 1, wherein the imaging system is further configured to determine the thickness of the existing first key and the identification system uses the determined thickness in part to determine the key blank associated with the existing first key.

17. A system for duplicating a key, comprising:
an identification system, wherein the identification system includes:
a housing;
a slot opening in the housing configured to selectively receive the shank of an existing first key and the shank of an existing second key;
a transponder sensor configured to detect the presence of a transponder within an existing second key and to read a transponder code associated with the detected transponder;
an imaging system comprising one or more light sources and one or more cameras, wherein the imaging system is configured to determine at least a channel profile of each side of the shank of the existing first key and a bitting pattern of the first and second keys when the first and second keys are received in the slot;
wireless communication hardware; and
a user interface associated with the housing,
wherein the user interface includes a touch screen, and
wherein the user interface is configured to provide status information to a user regarding a key duplication process; and
a fabrication system located at a location remote from the identification system, wherein the fabrication system includes:
wireless communication hardware; and
at least one system for duplication of the existing first or second key selected from the group of systems consisting of a cutting system, a milling system, and a transponder cloning pocket;
wherein the wireless communication hardware of the identification system and the wireless communication hardware of the fabrication system are configured to exchange communications, and
wherein the identification system is configured to transmit information associated with the determined channel profiles of each side of the shank of the existing first key and the determined bitting pattern of the existing first key to the fabrication system via the wireless communication hardware.

18. The system of claim 17, wherein upon detection of the presence of a transponder within the existing second key, the user interface is further configured to receive input from a user via the touchscreen comprising at least one input selected from the group of inputs consisting of a make of an automobile associated with the existing second key, a model of an automobile associated with the existing second key, and a year of an automobile associated with the existing second key.

19. The system of claim 18, wherein the identification system is configured to transmit information associated with one or both of the transponder code read from the transponder and the user input comprising at least one input selected from the group of inputs consisting of a make of an automobile associated with the existing second key, a model of an automobile associated with the existing second key, and a year of an automobile associated with the existing second key to the fabrication system via the wireless communication hardware.

20. The system of claim 19, wherein:
the fabrication system includes a transponder cloning pocket; and
the fabrication system is configured to program a transponder within a key blank with the transponder code received from the identification system.

21. The system of claim 20, wherein the user interface is further configured to receive input from a user via the touchscreen comprising a delivery address for a duplicated key that is to be fabricated by the fabrication system.

22. A key making machine, comprising:
a housing;
a credit card reader;
an identification system, wherein the identification system includes:
 a slot opening in the housing configured to receive the shank of an existing first key;
 a transponder sensor configured to detect the presence of a transponder within an existing second key and to read a transponder code associated with the detected transponder; and
 an imaging system comprising one or more light sources and one or more cameras, wherein the imaging system is configured to determine both a bitting pattern of the existing first key and a channel profile of both sides of the shank of the existing first key, and
 wherein the identification system uses the determined channel profiles of both sides of the shank of the existing key to at least in part identify the existing first key; and
a fabrication system configured to cut the determined bitting pattern of the existing first key into a key blank selected from a plurality of a key blanks which the identification system has determined to be associated with the existing key based at least in part on the determined channel profiles on both sides of the shank of the existing first key,
wherein the key making machine is configured to transmit the transponder code read from the transponder to a remote system to permit an existing second key with a transponder to be duplicated by the remote system.

23. The key making machine of claim 22, further comprising a user interface that provides instruction to a user regarding key insertion through visual means.

24. The key making machine of claim 23, wherein the visual means includes illumination of lights.

25. The key making machine of claim 22, wherein the channel profiles on both sides of the existing first key are determined by a single imaging process.

26. The key making machine of claim 22, wherein the transponder sensor includes cloning coils mounted to the housing at or around the slot opening.

27. The key making machine of claim 22, wherein the user interface is configured to ask a user if the user desires to store data associated with a particular key duplication event to be stored for later use.

28. The key making machine of claim 27, wherein the data is stored at the key making machine.

29. The key making machine of claim 27, wherein the machine is configured to communicate the data associated with the particular key duplication event to a remote location.

30. The key making machine of claim 22, wherein the housing includes vertically oriented chutes to store key blanks internally within the housing, the chutes have an opening at a lower most end that is configured to allow only a single key blank stored in a chute to be removed from the chute at a time.

* * * * *